Feb. 17, 1931.  H. S. BAILEY ET AL  1,792,476
ORE ROASTING MUFFLED RETORT FURNACE
Filed Aug. 30, 1927  13 Sheets-Sheet 1
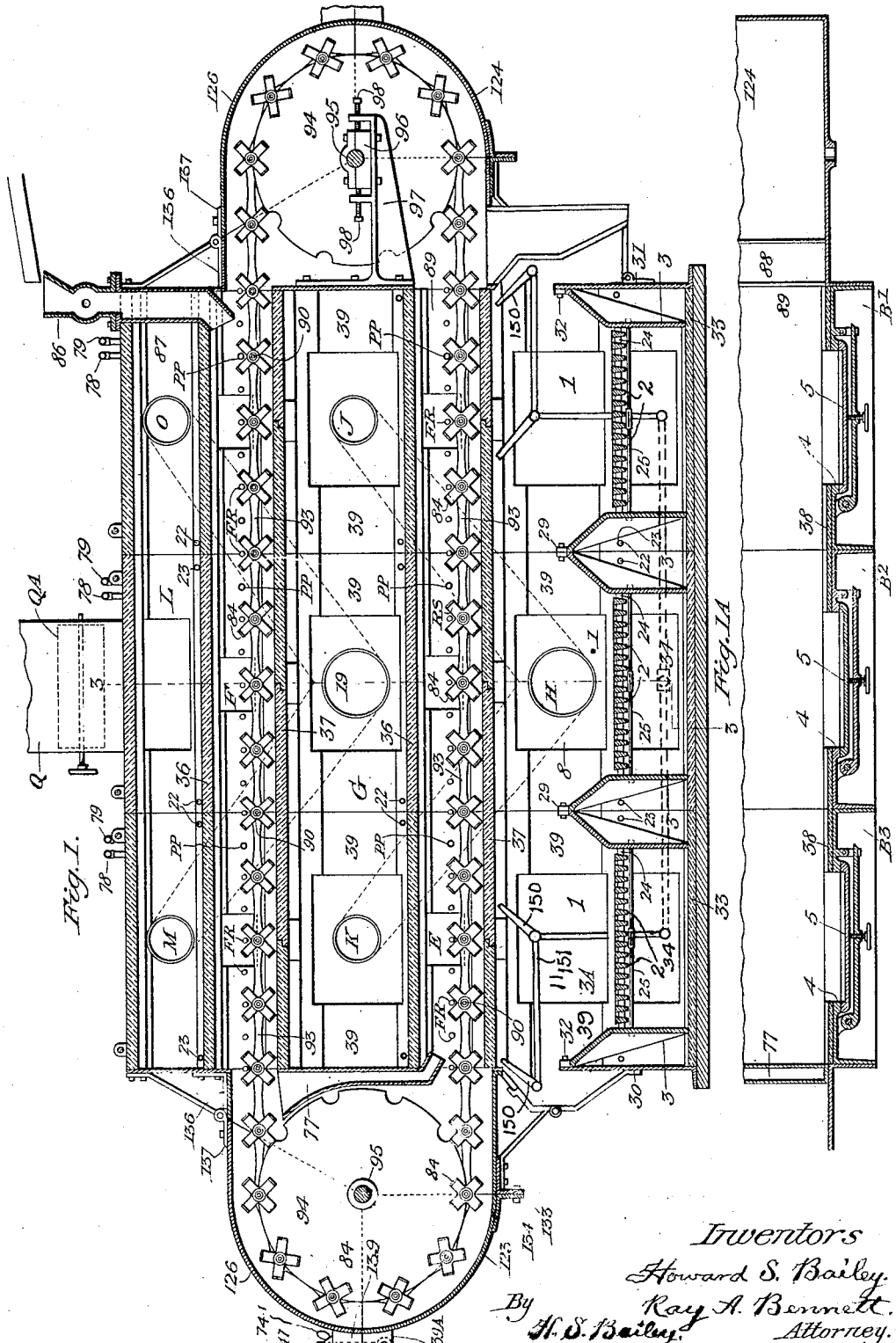
Inventors
Howard S. Bailey.
Ray A. Bennett.
By H. S. Bailey,
Attorney.

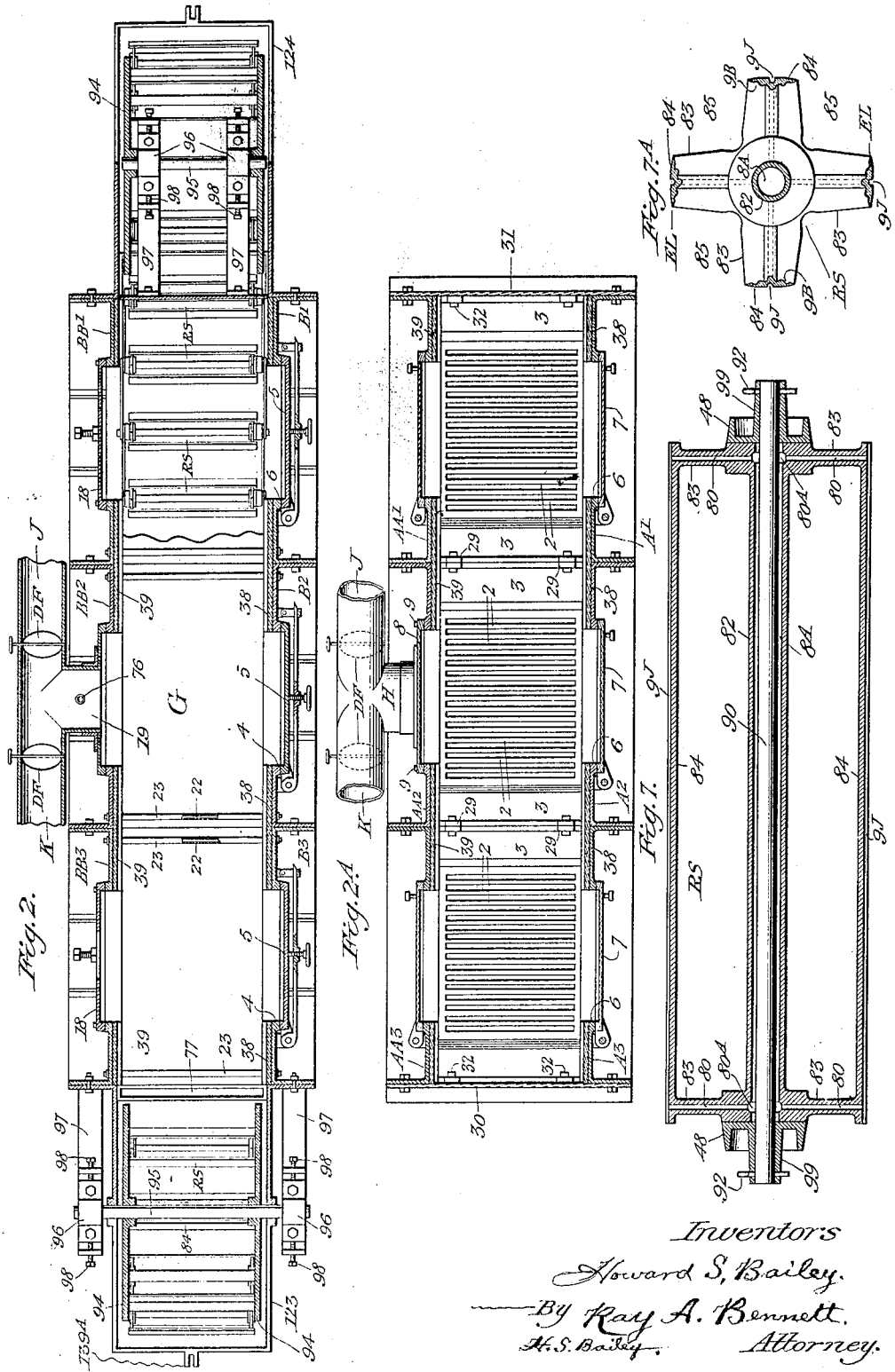

Feb. 17, 1931. H. S. BAILEY ET AL 1,792,476
ORE ROASTING MUFFLED RETORT FURNACE
Filed Aug. 30, 1927 13 Sheets-Sheet 3
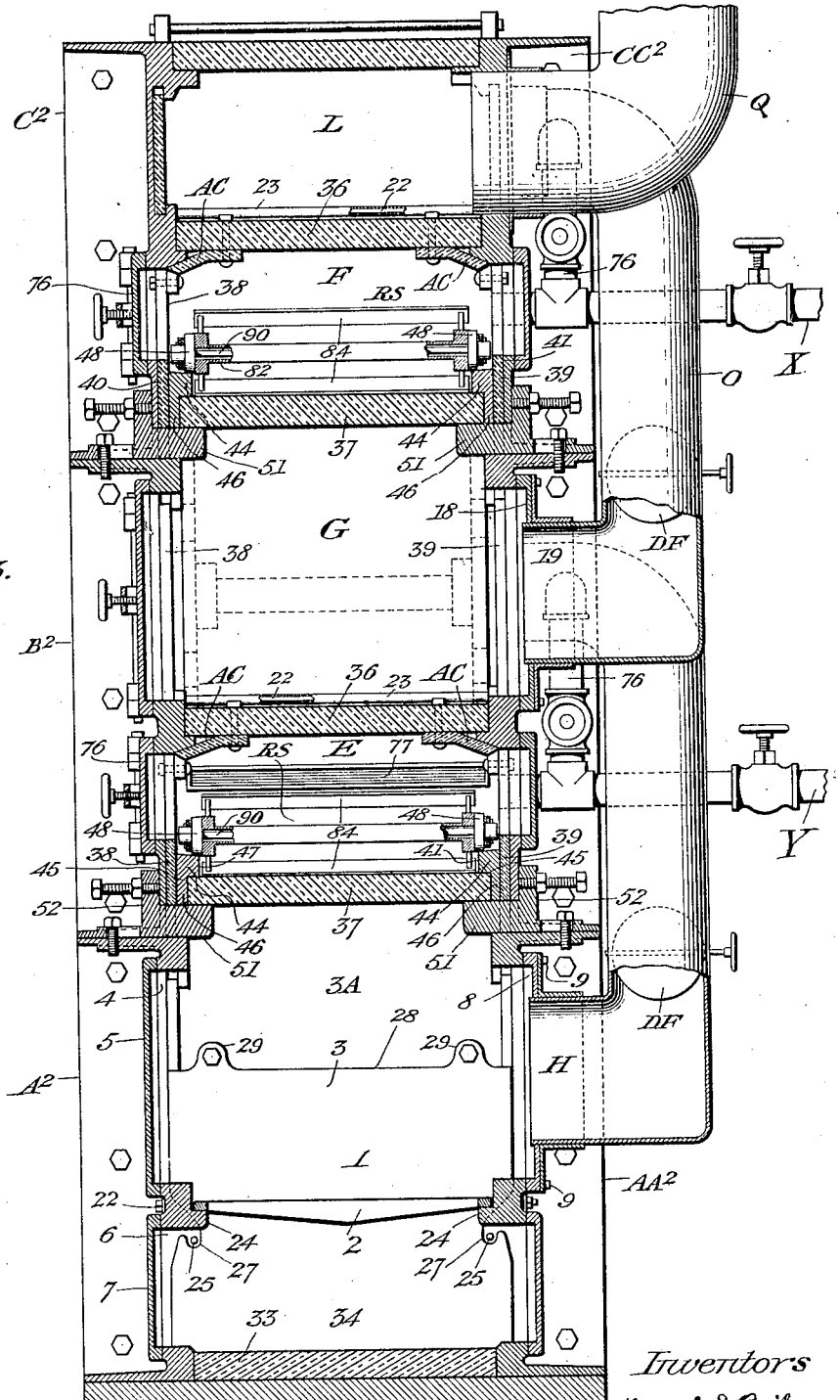

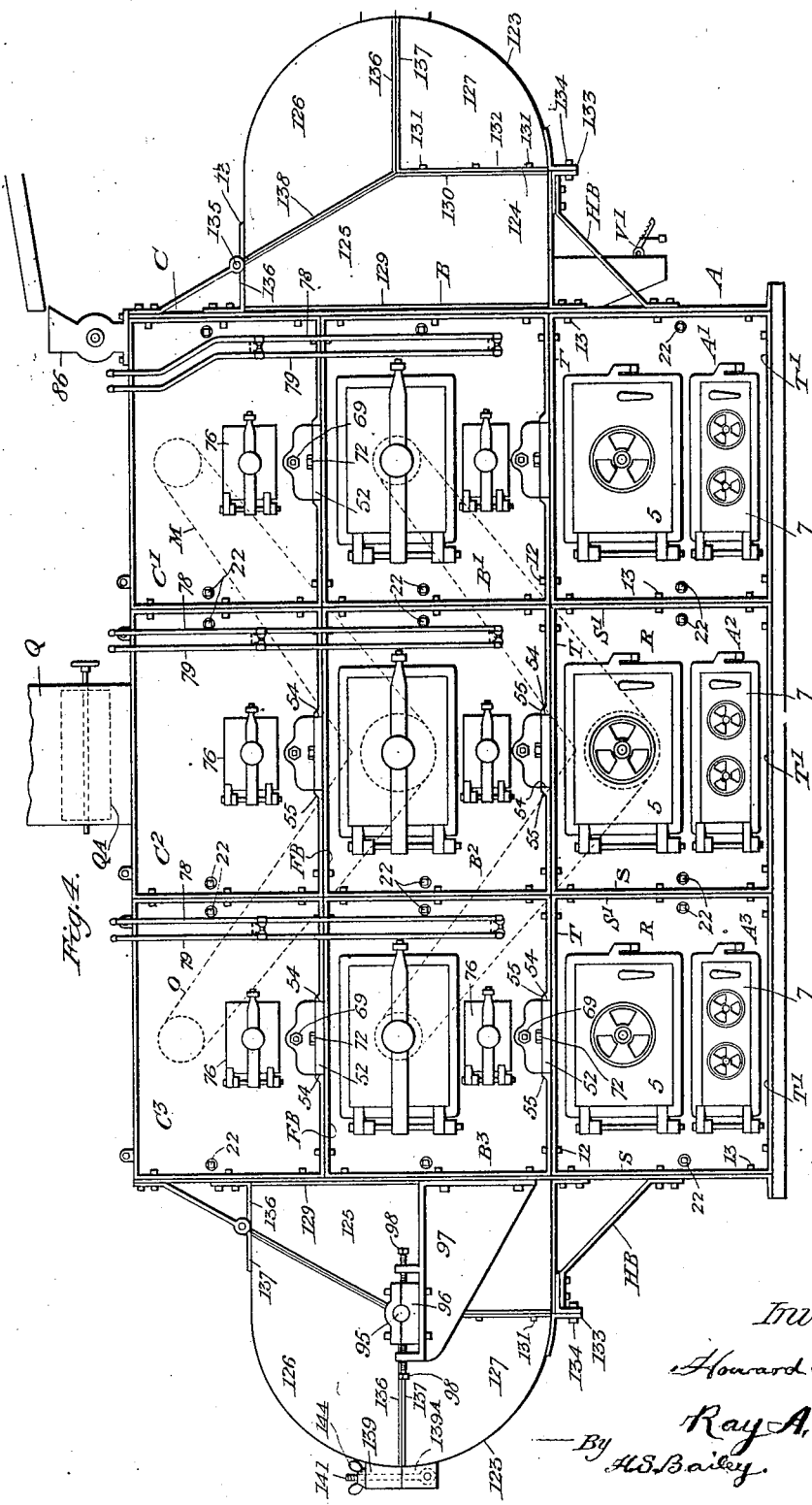

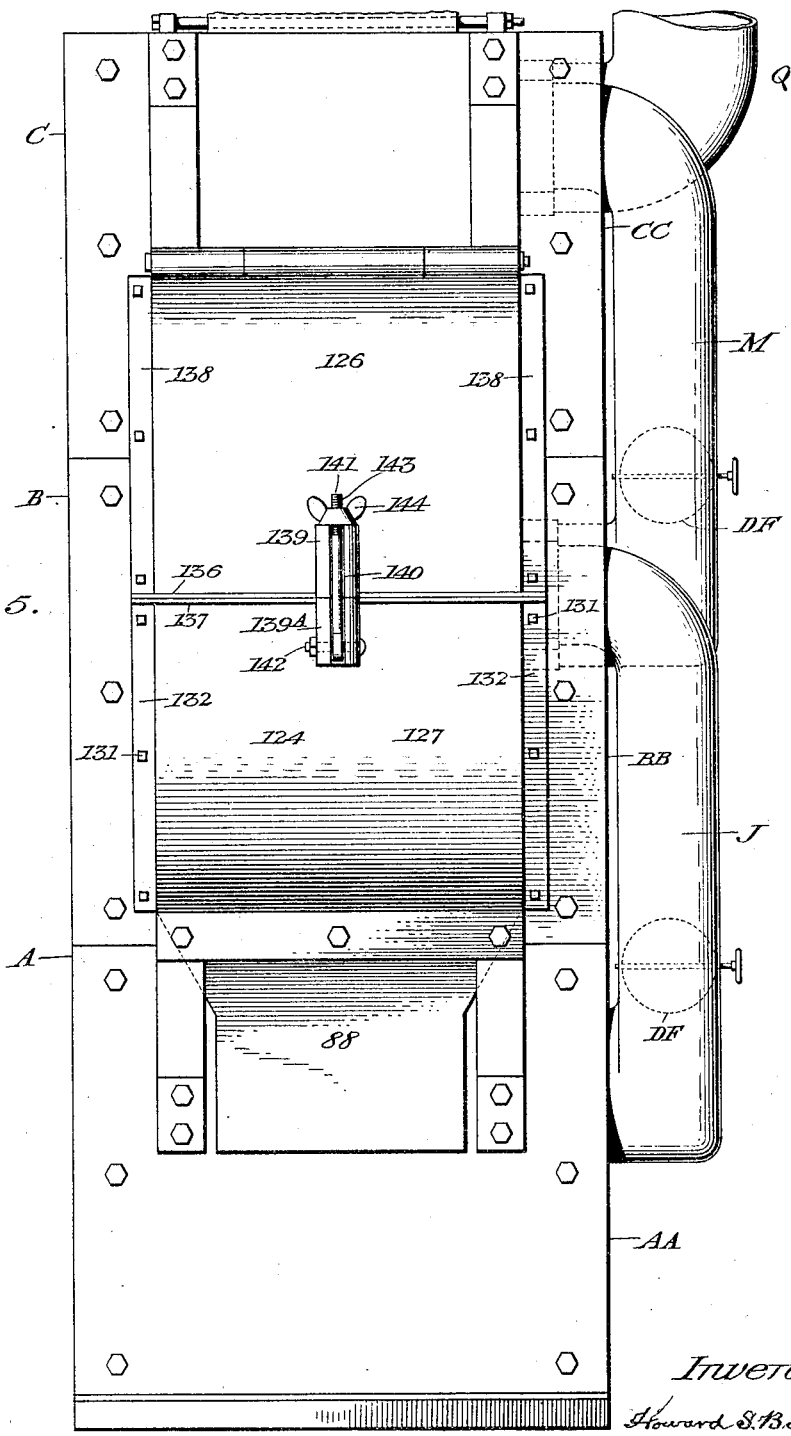

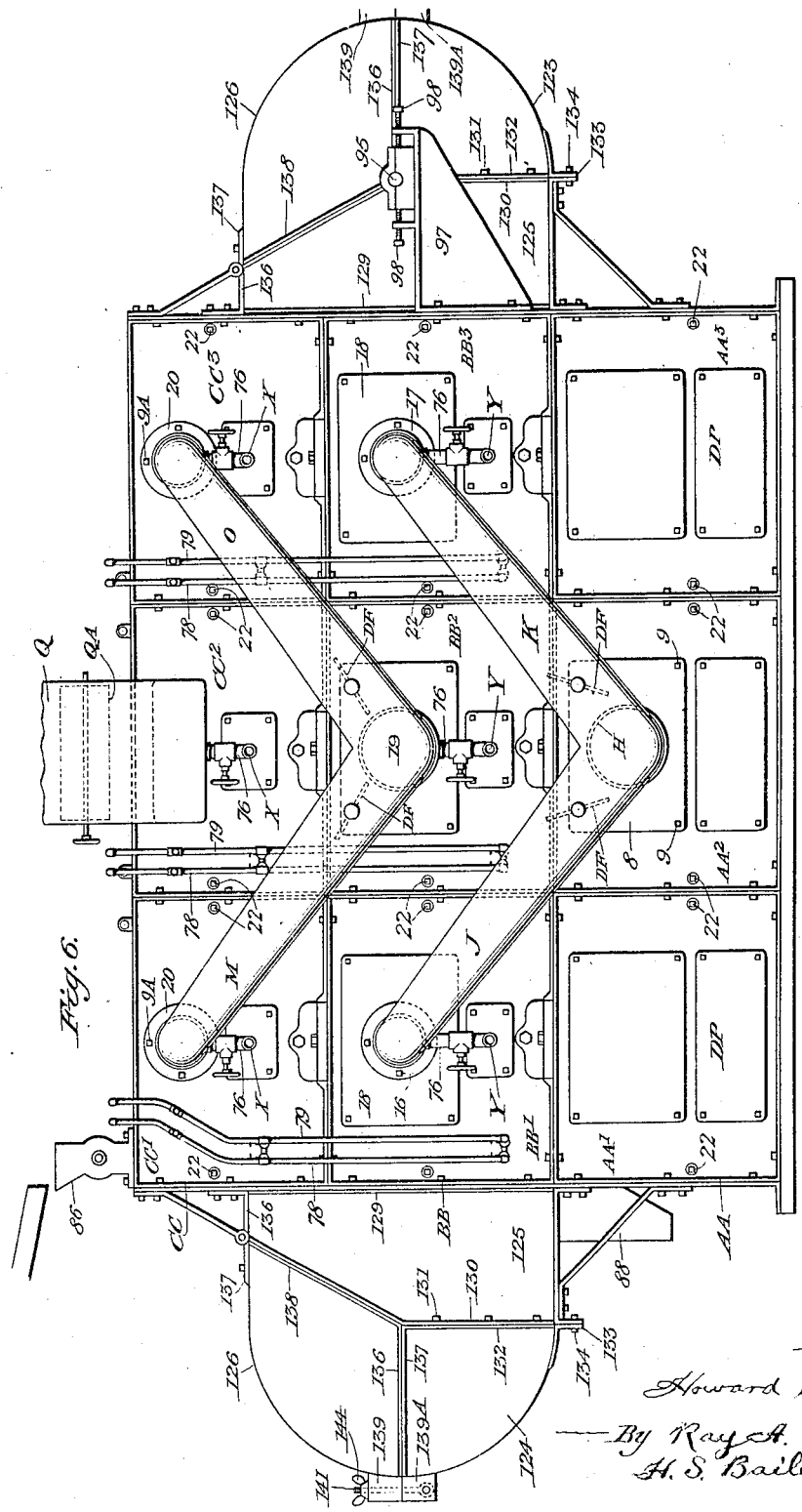

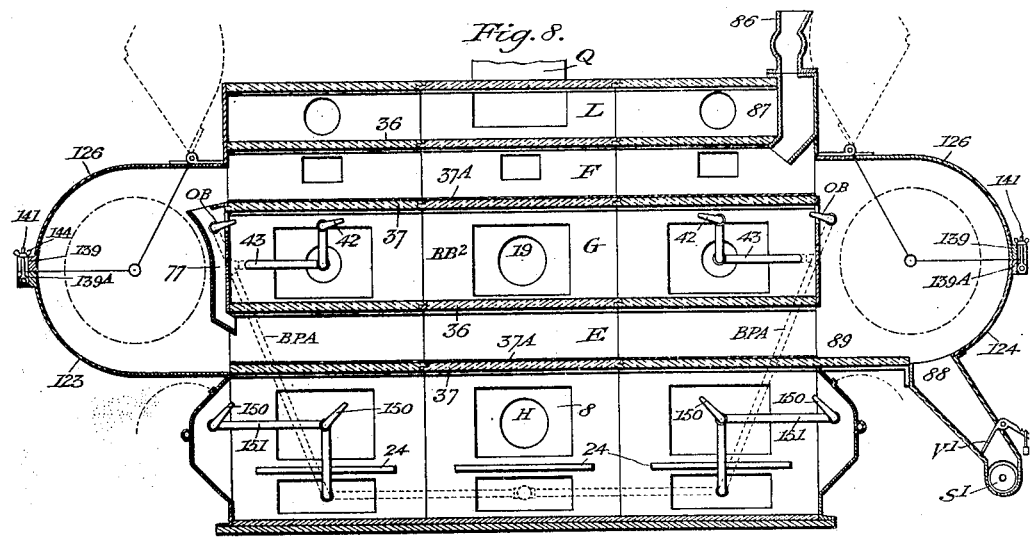
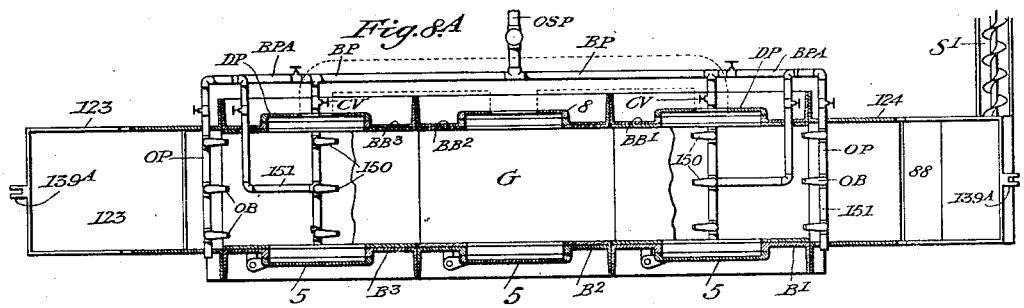
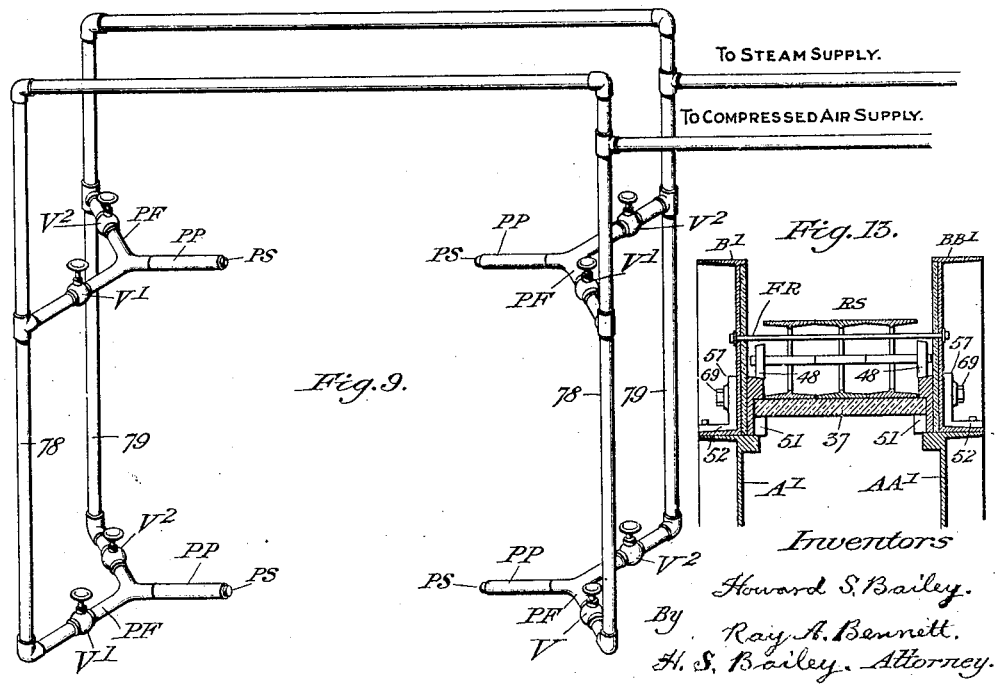

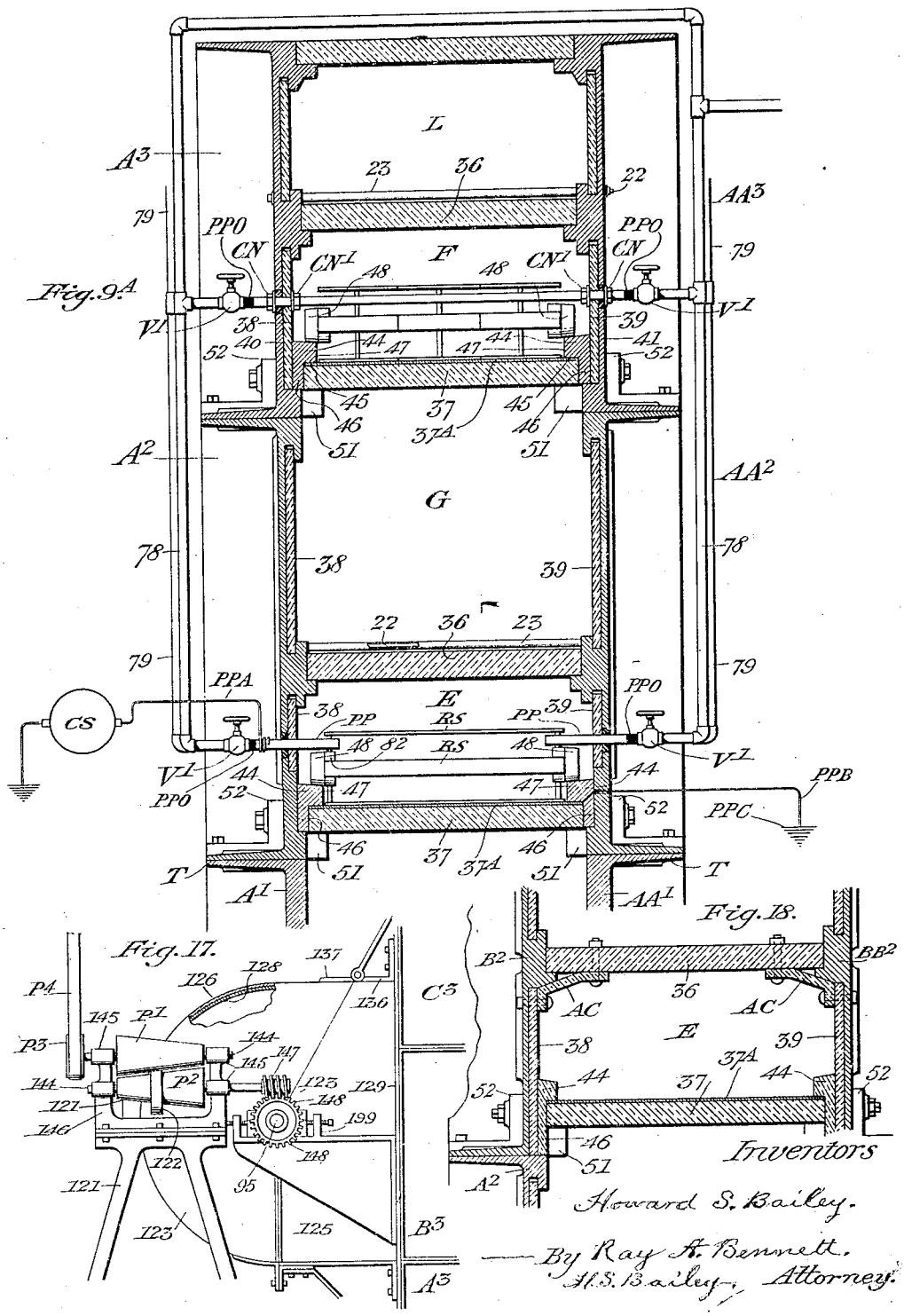

Feb. 17, 1931.  H. S. BAILEY ET AL  1,792,476
ORE ROASTING MUFFLED RETORT FURNACE
Filed Aug. 30, 1927   13 Sheets-Sheet 9
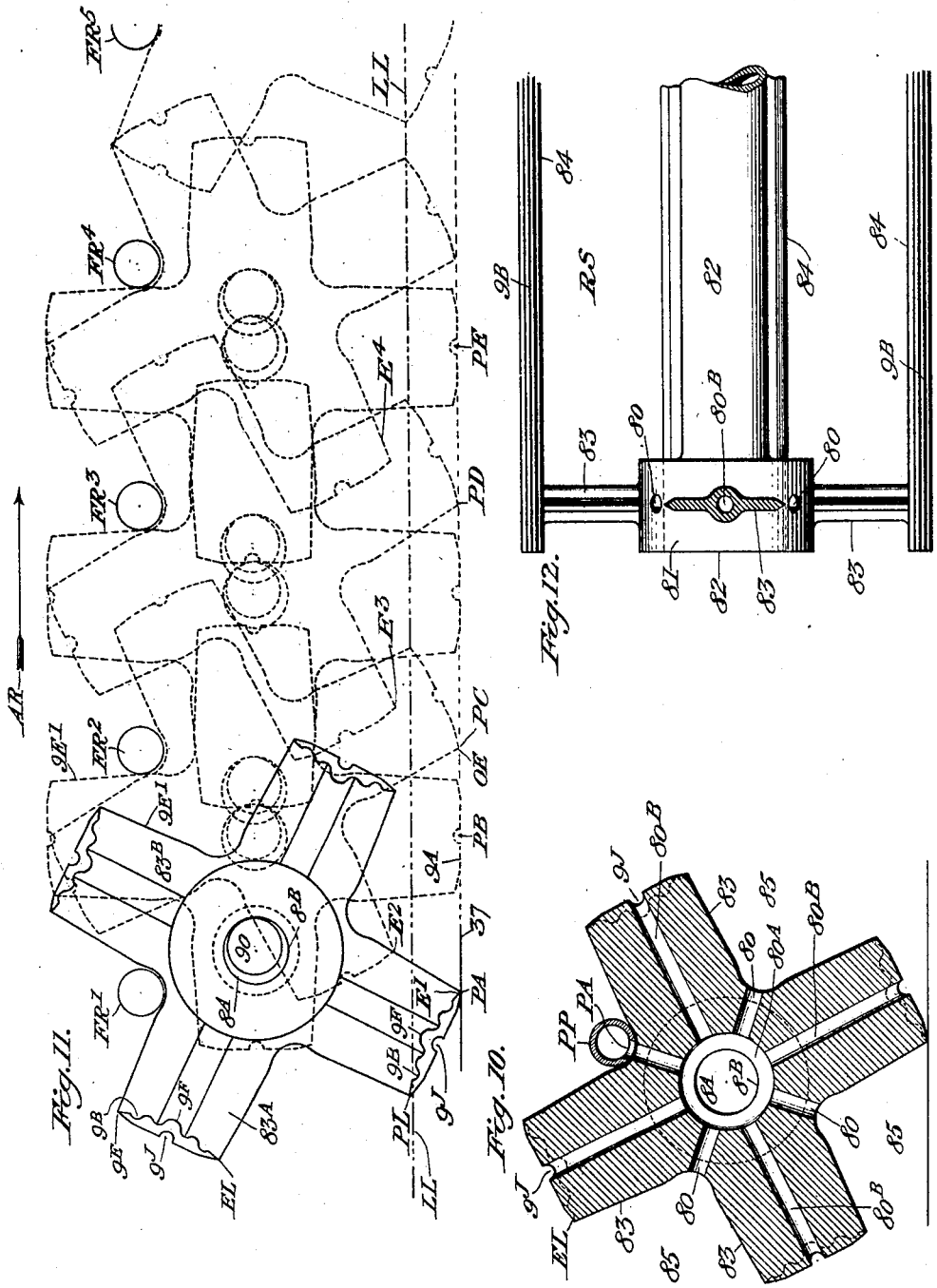
Inventors
Howard S. Bailey.
Ray A. Bennett.
By H.S.Bailey.  Attorney.

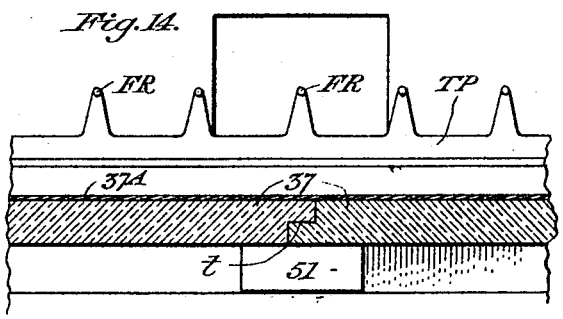
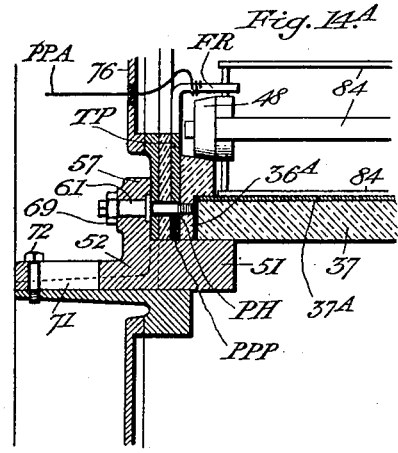
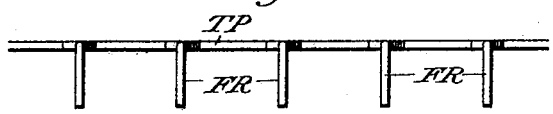
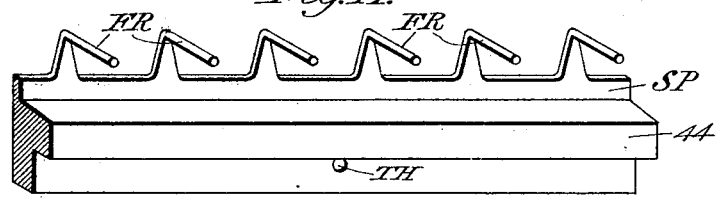
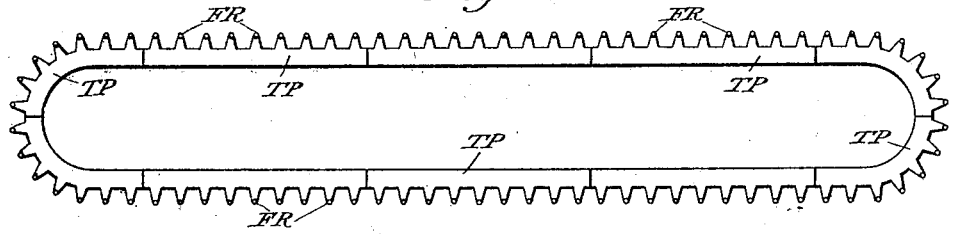
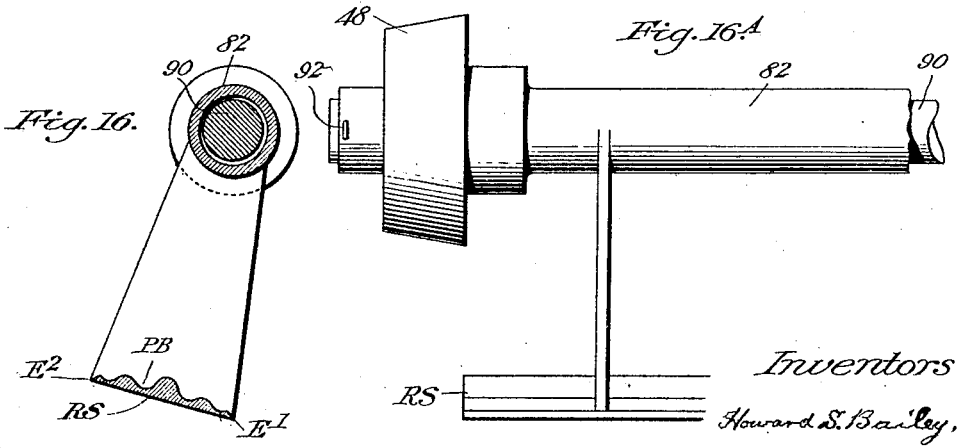

Feb. 17, 1931.　　　H. S. BAILEY ET AL　　　1,792,476
ORE ROASTING MUFFLED RETORT FURNACE
Filed Aug. 30, 1927　　13 Sheets-Sheet 11
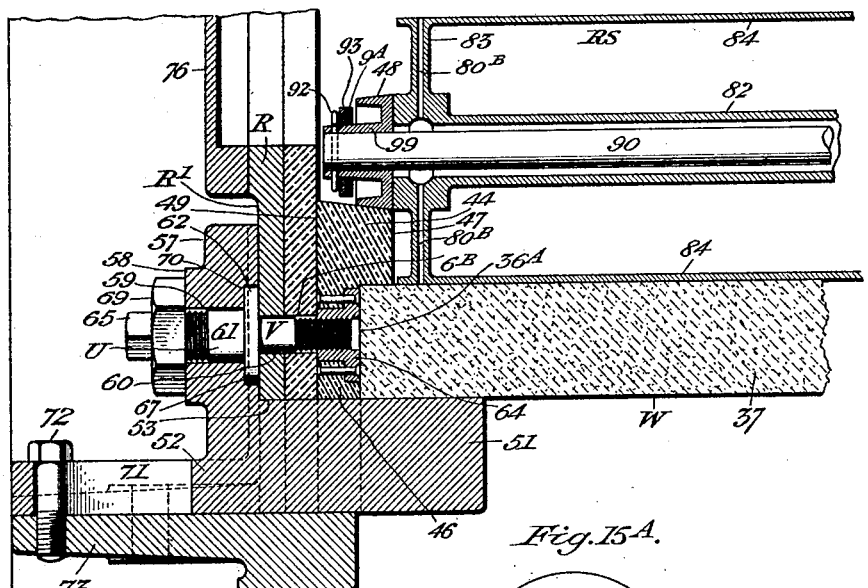
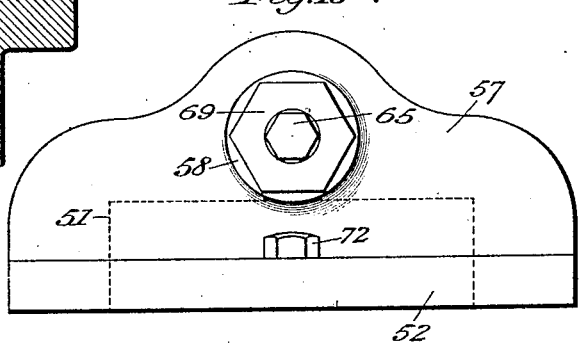
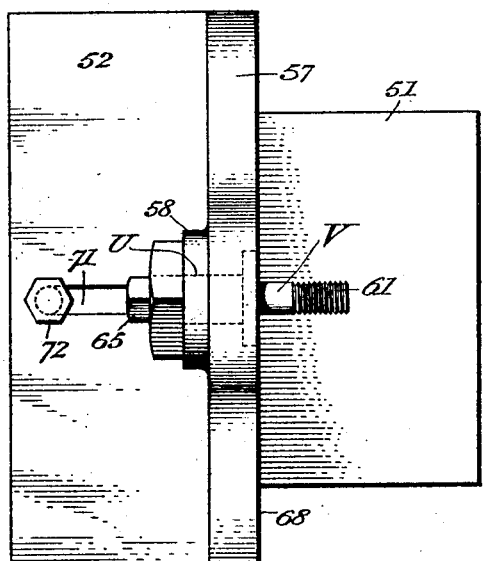
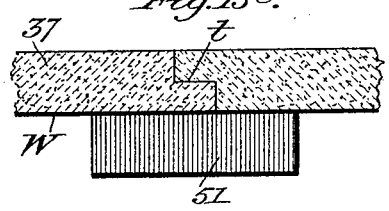
Inventors
Howard S. Bailey.
Roy A. Bennett.
By H. S. Bailey. Attorney.

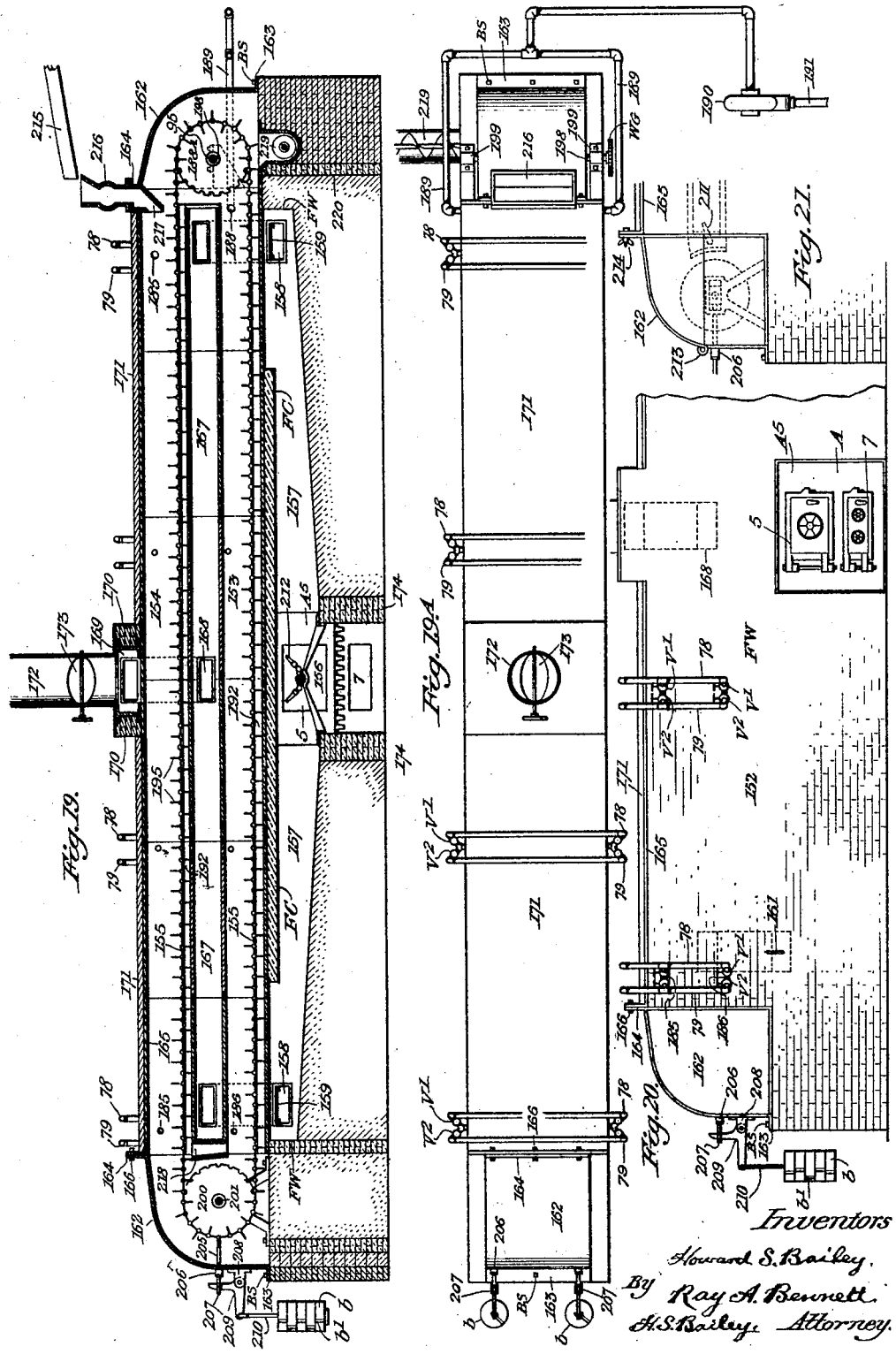

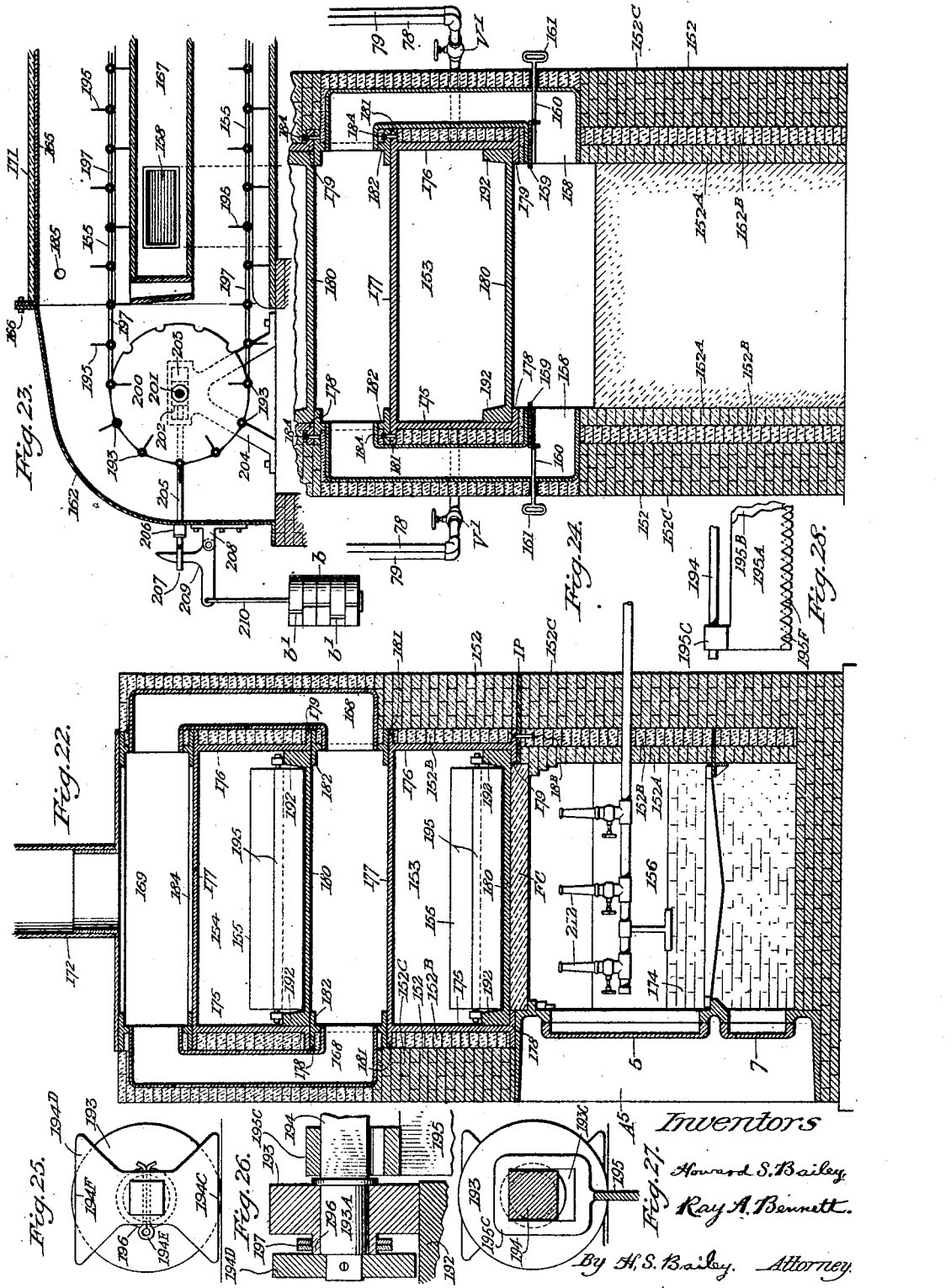

Patented Feb. 17, 1931

1,792,476

UNITED STATES PATENT OFFICE

HOWARD S. BAILEY AND RAY A. BENNETT, OF DENVER, COLORADO; SAID BAILEY ASSIGNOR TO SAID BENNETT

ORE-ROASTING MUFFLED-RETORT FURNACE

Application filed August 30, 1927. Serial No. 216,379.

Our invention is for an ore roasting furnace, and it is for that type of ore roasting furnace in which ore is automatically fed through enclosed air-tight retorts mounted in a furnace in such a manner that the heat generated in the furnace from any heat producing source, that generates flames and gases and other products of combustion are prevented from coming in contact with the ore within the enclosed retorts while the ore is traveling through them, consequently the ore is heated by an indirect and radiated and by a muffled heat.

The objects of our invention are:

First, to provide a furnace particularly adapted to roast ores by a muffled or indirect heat in such a manner as to volatilize and eliminate from them the sulphur, arsenic antimony and other metalloids and deleterious substances, and that will allow the precious metals that are in the ores to assume an individual separation from each other and from all other material in them as will enable each metal to be recovered by itself after roasting, by new mechanical, chemical and magnetical treatments.

Second, to provide means by which the ore during the progress of its roasting treatment can be viewed, inspected and sampled at several different places in the length of said furnace in order that its progressive changes from raw ore to roasted ore, may be tested to determine the speed and heat to be applied to it to attain a perfectly roasted ore product within the distance it travels through the furnace from the time it is fed into the furnace until it is discharged from it by its automatically operating ore feeding and rabbling and mixing mechanism.

Third, to provide means in an ore roasting retort furnace for heating it and its retorts, by means of coal or other combustible material or by means of oil or gas burners or by electricity in the retorts and other heating apparatus, and for so cooperatively arranging the furnace and its retorts, that the ore within the retorts is roasted by heat from the heat producing means penetrating into and through the bottom, sides and top members of the retorts against and into and through the ore therein, and for preventing any gases that would be generated by any heat producing members from coming in contact with the ore in the retort of said furnace.

Fourth, to provide in an ore roasting retort furnace, provided preferably with two retorts and provided with means for feeding crushed and dried ores comminuted to that degree of fineness best adapted to enable them to receive a perfect roast; the said ore feeding means being arranged and adapted to continuously feed the ore forward through said retorts from the ore entering to their discharging end and arranged and adapted to rabble and mix and turn the ore over and over by mechanism that will shovel the ore along the floors of the ore roasting retorts and at the same time shovel it up and raise it up from the floors of the retorts and allow it to discharge by gravity back into the floors of the retorts so that the top portion of the layer of ore which may vary from about one-half inch to about two inches in depth, being fed through the retorts and is deposited on the floors on the retorts and the portion of it that was on the floors of the retorts is deposited on top of the layer of ore in numerous short continuously operating ore shoveling and rotating movements, raising and gravity discharging movements as the ore is continuously fed through and progressively forward through the retort from their ore feeding-in end to their discharging end.

Fifth, to provide means in an ore roasting retort furnace, by which the retorts within the enclosing walls of the furnace are made of short separate independent bottom, opposite sides and top pieces, the ends of which are formed to connect with each other in such a manner as to form rectangular shaped retorts, that are enclosed and supported by enclosing castings or other wall like members that form the furnace portion of the ore roasting retorts in which the heat that effects the roasting treatment is generated and applied to the retorts and in which the said sectionally constructed retorts are so arranged that any one or two or more of their separate and independent members can be removed from the retorts and from within the furnace without removing the enclosing and supporting castings or other wall members of the ore roasting retort furnace.

We attain these objects by the mechanism illustrated in the accompanying drawings, in which:—

Figure 1, is a longitudinal vertical sectional view through the center of our ore roasting retort furnace.

Figure 1A, is a sectional plan view through the lower retort through the doors that enter the sides of the retort and also showing a section through the chute that conveys the ore from the upper retort to the floor of the lower retort.

Figure 2 is a sectional plan view through the lower retort F, and the hood members at its opposite ends showing a fragmentary view of the rabbling rollers and the cross bolts and the spacing tubes that are mounted upon them.

Figure 2A, is a sectional plan view through the foundation castings A and AA, showing the fuel burning grates and the doors on the opposite sides of the furnace leading into these grates as well as the heat and smoke outlet flue and pipe and the two branch pipes that extend from it up to the opposite ends of the flue G, between the upper and lower retort.

Figure 3, is a vertical cross sectional view of Figure 1 on line 3—3.

Figure 4, is a front side elevation of our ore roasting retort furnace showing the entrance doors into the retorts, also the doors leading into the flue between the retorts, also the doors leading to the heating means and the doors leading into the ash pit in the foundation casting of the furnace.

Figure 5, is an end elevation of our retort furnace.

Figure 6, is a rear side elevation of our ore roasting retort furnace, showing the arrangement of the outside heat and smoke conveying pipes from the combustion chamber below the lower retort into the flue between the retorts and from it into the upper flue and from it into the smoke stack.

Figures 7 and 7A illustrate a side elevation and also an end elevation of one of the rotary ore feeding, scraping, raising and turning over rollers.

Figures 8 and 8A illustrate a sectional side elevation and plan view of the application of oil supplying pipes and oil burners to heat the lower and upper retorts independent of each other; two sets of oil burners being shown at each of the opposite ends of the flue 3A below the floor of the lower retort and two sets at each of the opposite ends of the flue G below the floor of the upper retort.

Figures 9 and 9A illustrate two views, the preferred arrangement of the valve controlled pipes to admit either compressed air or steam to the retorts.

Figure 10, is a cross sectional view through an ore rabbling roller, showing the air and steam passageways through it that register with the air and steam inlet pipes.

Figure 11, illustrates four different rotative positions that the ore rabbling rollers assume in making a full revolution, and the cross shafts which form a part of the endless conveyor and upon which said ore feeding rollers are loosely enough mounted to have a short vertical movement on them.

Figure 12, illustrates a sectional view of the shoveling rim and a spoke of one of the ore rabbling rollers placed on a cross shaft of the conveyor and shows that the opposite beveled edges of it taper to about a knife like edge.

Figure 13, illustrates three ore rabbling rollers mounted on one of the cross shafts of the conveyor showing the spokes of each roller placed in the center of the length of the roller, and it also illustrates one of the fixed rods that causes the roller to rotate intermittently a quarter of its full revolution extending through the furnace and across the spokes of the rollers in position to be engaged by them as the rollers are moved through the retorts by the conveyor.

Figures 14, 14A, and 14B, illustrate a side elevation, an end elevation, a plan view, respectively, of a few of the many short fixed rods FG and their supporting plate, that act to turn the ore rabbling rollers as the rollers are moved continuously forward through the two retorts; and Figure 14C, is a fragmentary perspective view of the track member 44 upon which the beveled wheels 48 of the conveyor run, and it illustrates the short fixed rods FR with their depending lug member cast into a combined integral track member and fixed rods casting; and Figure 14D simply illustrates a different way from that illustrated in Figures 14, 14A and 14B, of supporting the short fixed rods FR wholly within the retorts instead of extending them entirely across and through the retorts and the outside wall castings as shown in Figure 13.

Figures 15, 15A, 15B and 15C, illustrate a side elevation and a front end view and a plan view and a fragmentary sectional view of the sliding blocks that support the floor sections; and a fragmentary view of the fire clay sections and the bracket of a sliding block and the cooperating parts that support the sliding block in the outside wall castings B and BB and C and CC.

Figures 16 and 16A illustrate an end elevation and a side elevation of a gravity operating and forwardly feeding double shoveling edge ore rabbler that is a modification of the ore rabbling roller RS as it consists of only one spoke and shovel blade of the full roller.

Figure 17, illustrates a side elevation and an end view of the variable time and speed imparting and power applying mechanism that moves the conveyor through the retorts.

Figure 18, is a cross sectional view through the outside cast iron supporting walls of the furnace and one of the ore roasting retorts through its ore roasting chamber, and this view shows that each retort is a complete unit by itself and is independent of the outside cast iron supporting walls of the furnace, and this view shows that it consists of a roof member 36, a floor member 37 and two opposite side members 38 and 39 and the track members 44 and all of these retort members can be made of any suitable material or materials.

Figure 19 is a vertical longitudinal sectional view of a furnace that is a modification of our furnace shown in Figures 1 to 6.

Figure 19A is a plan view of the furnace shown in Fig. 19.

Figure 20, is a front side elevation of a little over one half of the length of the furnace shown in Figures 19 and 19A.

Figure 21, is a side elevation of one of the hoods showing its top portion pivotally hinged to its lower portion and provided with a hand operating nut and bolt that enables the door portion to be quickly opened to inspect the conveyor and oil burners without removing the hood from its brick supporting walls.

Figure 22, is a vertical cross sectional view through the furnace through the center of its length, which shows a cross section through its coal burning grates and its oil burners and the door frame and doors leading into them and also the by-pass flue that leads from the middle flue between the retorts into the flue above the upper retort and into the smoke stack.

Figure 23, is a vertical sectional elevation of a fragmentary portion of that end of the furnace and its enclosive hood members and it shows the terminal end of the ore rabbling stirring and forwardly feeding conveyor and the automatically operative mechanism for holding the conveyor and its sprocket wheels taut on its tracks within the retorts.

Figure 24, is a vertical cross sectional view through the furnace and one of the valve controlled by-pass flues that conveys the heat from the fire box and the flue extending in opposite directions from it below the lower retort, around it and into the flue between the two retorts, and shows a sliding gate valve mounted in the flue to either partially or wholly close the heat passageway through it, and it also illustrates air or steam inlet pipes entering the lower retort through the opposite brick walls and the opposite sides of the retort.

Figures 25 and 26, illustrate front end and sectional views of the combined roller of the conveyor, the cross shaft thereof, the ends of the tracks and the track engaging block that prevents the ore rabblers and the stirring blades from turning out of a vertical position relative to the floor of the retorts.

Figure 27, is a cross sectional view of one of the conveying cross shafts, that supports one of the ore rabbling and stirring blades, and it illustrates a square shaped cross shaft and a rabbling blade with a square aperture through it that fits loosely on the square shaft sidewise and that is provided with an aperture enough longer than the thickness of the square shaft to allow the rabbling blade a slight vertical movement upon it in order that the rabbling blade will have a slightly compensating movement up and down on the square shaft to enable its lower edge to always engage the floors of the retorts, even should any one or more rollers on the tracks run over anything or be raised up from the floor from any cause.

Figure 28, illustrates a fragmentary view of one of the ore rabbling blades showing the V-shaped recesses in its floor engaging edge, and the next rabbling blade to it would be made the same way, except that the V-shaped recesses would be placed in staggered relation to these shown in Figure 28; while in the cross sectional view of Figure 22, another rabbling blade is shown which has a solid imperforated non-recessed edge across its end portion that engages the floors of the retorts; this rabbling blade is the ore pushing or feeding ahead blade and these three blades are placed in successive order throughout the length of the conveyor.

Referring to the drawings:

We illustrate our improved ore roasting retort furnace, constructed with its outside front walls A, and its outside rear wall B, made entirely of cast iron castings and placed in pairs back to back at a sufficient distance apart to receive between them two ore roasting retorts E and F, that are built one above the other within them, above the lowest or foundation row of castings A1, A2, A3 and AA1, AA2, and AA3.

The furnace is also provided with means for heating these two retorts and each pair of the foundation castings A and B contain between them a fire box 1, that is provided with grate bars 2 and fire walls 3, and a flue 3A, that extends the whole length of the furnace underneath the floor of the lower retort; and the fire boxes can also be provided with piping and burners for burning either oil or gas, as will be hereinafter fully illustrated and described; and the products of combustion from coal or oil or gas burned either on the grate bars of the fire boxes or from above them, heats the bottom of the lower retort E.

The three foundation castings A1, A2 and A3, are provided with coal entrance door openings 4, and with doors 5, hinged to the castings to fit over and close or open the openings 4, through which coal or other fuel is fed to the grates 2, and they are also provided with ash pit openings 6 and with doors 7, which are hinged to the castings to fit over the close or open the ash pit openings; and these door openings and their doors are positioned just above and below the grates 2, in each foundation casting, except the coal entrance openings 4, of the rear middle foundation casting over which, instead of a door, a flat plate of cast iron 8 is secured by cap screws 9.

As illustrated in Figures 2, 3 and 4, we show a retort furnace, the front side walls and the rear side walls of which consist of the three independent longitudinal groups of castings A and AA, B and BB, C and CC, and each casting of each one of these three groups is of the same length and each casting is preferably made five feet in length, consequently each one of the three groups of castings is fifteen feet long when placed and secured tightly together side by side; but longer retort furnaces can be made by adding one or more castings to either one or both ends of all three rows of the outside wall castings.

All of the foundation castings A and AA are cast from one pattern, consequently they are all alike. Also all of the castings B and BB are made from one pattern and consequently they are all alike, and also all of the castings C and CC are made from the same pattern and consequently they are all alike; and the patterns and consequently the castings are all made in the form of a rectangular frame that has a flat center or wall portion R from which sides S and S1, and top and bottom flanges T and T1 project out several inches in front of the wall portion R, and their vertical flanges that bear against each other and their longitudinal flanges that rest on top of each other are securably bolted together by bolts 12 and 13.

There is also a flue G, between the lower and upper retorts E and F, that not only receives heat from the heat producing means in the foundation castings A and AA, B and BB and C and CC, but which is also provided with independent heat producing means in the form of oil burners or gas burners, which will be presently explained, consequently the upper retort F, is not heated wholly by the heat generated in the fire boxes of the foundation castings A and AA, although all of the heat generated in them flows up into the flue G, and against the bottom of the upper retort F, after it has flowed directly up against the bottom of the lower retort E, from the fire boxes and along it to and into and through a pipe flue H, which extends out through the middle casting AA2, of the rear row of foundation castings AA, and from this pipe flue H, it flows through by-pass flues J and K, that are connected to the opposite sides 14 and 15 of the pipe flue H, and extend upwardly in opposite directions at oblique angles and they are secured to and extend through castings 16 and 17 into the flue G. The castings 16 and 17, are secured to the door frames 18 of the two opposite end castings BB1 and BB3, and the smoke and hot gases from the flue pipes J and K flow to the opposite end portions of the flue G. Dampers DF are placed in the by-pass flues J and K to partially or wholly close either one of them as desired, to even the heat flowing through them.

The outside cast iron wall castings A and AA, B and BB, C and CC, that support the two retorts E and F between them, are arranged so that the flames and gases from the heat producers cannot flow into the interior of these retorts E and F in contact with the ore being roasted therein; and the retorts are very tightly enclosed and muffled against the entrance of flames and gases produced by the combustion of coal or other material or of oil or gas, as it is an essential feature of our ore roasting retorts that they be enclosed air-tight against the entrance into them of gases of combustion which would prevent the chemical change we make in ores by our roasting treatment if they were allowed to enter them.

As above stated, the heat and gases and smoke from the fire boxes of the foundation castings flow to and into the opposite end portions of the middle flue G, and this middle flue G has a smoke and gas exit pipe flue 19, that is connected to and projects from the middle casting BB2, of the rear middle row of castings BB and from this middle flue G, the hot gases and smoke flow from the exit flue 19, through by-pass flues M and O, that extend in opposite directions from the flue 19 upwardly to and through supporting castings 20, that are secured to the rear side of the opposite end castings CC1 and CC3 by cap screws 9A to and into the upper flue L, that is formed between the top part of the upper row of castings C and CC, and all of the heat and products of combustion that flow from the middle flue G, into the upper flue L, flows from this flue L, into a smoke stack Q that is provided with a damper QA. The smoke stack is connected to and projects from the middle casting CC2 of the upper rear row of castings CC.

The foundation castings A1, A2, A3 and AA1, AA2 and AA3 and the fire walls 3, are secured together by bolts 22, that extend through spacing tubes 23, that are placed between and against the inside surface of the walls R and the castings A and AA, and that are made just long enough to allow the bolts 22 to clamp the walls R of the castings A and AA, and the fire wall castings 3 tightly together.

The opposite ends of the grate bars 2, rest on shelf portions 24, that are cast on and project from the inside surface of the walls R of the foundation castings A and AA, and the grate bars extend across the space between the inside surface of the castings A and AA as shown in the vertical cross section Figure 3, and the fire wall castings 3 are secured against the opposite ends of the projecting shelf portion 24, of the foundation castings by turn buckle bolts 25, the heads 26 of which fit in slots 27 formed in the opposite edges of the fire wall castings 3.

The top edges 28 of the fire wall castings 3, are also provided with projecting holed lugs 29, and the fire wall castings 3 of the fire boxes that are at the opposite ends of the furnace, are bolted to the plates 30 and 31, that extend across the opposite ends of the foundation castings, by bolts 32, that pass through the lugs 29 at their top edges. All six fire wall castings are made from one pattern, consequently they are all exactly alike and all that is necessary is to place them on opposite sides of the grates, as they are made to be reversed and placed on either side of the grate bars, and then bolt the interior ones together at their top edges, and the two fire wall castings 3, at the opposite ends of the furnace to the end plates 30 and 31. The lower ends of these fire wall castings extend down and rest on top of the fire brick floor 33 of the ash pit 34, as their lower portions form the opposite sides of each ash pit 34 of each fire box 1, as they extend parallel to the grate bars across the space between the foundation castings A and AA and along the opposite sides of the grate.

The second or middle row of the front and rear wall castings B and BB, enclose between their inside surface along the full length of their lower portion, the lower ore roasting retort E and along the full length of their upper portion, the middle flue G that receives the heat and smoke from the fire boxes and combustion chambers of the foundation castings A and AA as described, and these two portions E and the flue portion G of the middle row of castings B and BB are divided from each other by a roof member 36 which extends as the continuous roof member of the retort E and also forms a continuous floor member for the flue G throughout the entire length of the castings B and BB, and consequently of the furnace, although this combined roof and floor member is divided into easily handled pieces of the material of which it is made that are provided with rabbeted overlapping ends, as illustrated in Figure 1.

The whole of this lower retort E, is formed within the lower portion of and throughout the whole length of the middle rows of castings B and BB, all of which set on top of and are bolted to the top longitudinal flange T of the foundation fire box castings A and AA and it consists of, in addition to its roof member 36, a floor member 37 which also extends the whole length of the three castings to flush with their opposite outside ends; and the retort E also consists of oppositely positioned side plates 38 and 39, that extend down from its roof member 36 past its floor member 37, and rest on top of the flanges T of the outside wall castings A1, A2, A3 and AA1, AA2 and AA3, and thus the retort E is wholly formed between the outside wall castings B and BB and this description of the lower retort E also fits the construction and arrangement of the upper retorts F, as they are exactly alike and the same reference numerals are used for both retorts.

The inside lining plates 38 and 39 of the lower retort E and also of the upper retort F, are secured against the opposite inside surface of each row of opposing back to back outside wall castings B and BB, which contain the lower retort E and the outside wall castings C and CC, which contain the upper retort F, and consists preferably of asbestos boards as that material will prevent the radiation of the heat from the inside of the retorts, which comes into it through their floor members 37.

The roof members 36 of both of the lower and upper retorts, also preferably consists of asbestos boards. Our invention, however, contemplates the use of any other suitable material for the roof members, and also for the side members of each retort.

The lower retort E, is heated from either fuel on the grates or from oil or gas pipes arranged adjacent to them, and underneath the floor member of the lower retort E, but the flue member G, although it receives the heat and hot gases and smoke from the fuel or oil or gas flames in the fire boxes 1, of the castings A and AA is also provided with a separate and independent equipment of either oil or gas burners 42 and conveying pipes 43 in order that additional heat to that which flows into the flue G, from the fire box heating apparatus in the castings A and AA may be applied directly to the bottom of the floor member 37 of the upper retort F as is illustrated in Figures 8 and 8A, which especially illustrate the oil burning apparatus for heating the bottom of the floor member 37 of the upper retort F.

Each of the two retorts illustrated, E and F, is provided with track members 44, that are preferably made of pieces of material, that are separate from the opposite side members 38 and 39 of the retorts, and these track members are secured up against the side members 38 and 39, as will be hereinafter described. The track members are each formed with a right angled inwardly shouldered recess 45, that permits their upper end portions to extend over on top of the opposite ends of the fire clay floor slabs 37, while their narrow portions 46 extend down past and close to the opposite end of the floor slabs 37, and their lower ends rest on top of the longitudinal flanges T of the castings A and AA and B and BB; the upper ends of these track members 44, extend a short distance above the surface of the floor member 37 to the inside edge 47 of the track, the top surface of which is beveled upwardly slightly from this edge across the width of the track, which is the full thickness of the track member and is made wide enough to receive a slightly beveled faced wheel 48; the surfaces of the tracks and the wheels can be made flat if desired, but are shown beveled downwardly and inwardly from the rear edge 49 to the inner edge 47, in order to allow any ore, that is moved by the rabbling mechanism up on top of the track, to slide off from it into the ore space between the two tracks and on and above the floor. The inner surfaces of the track members above the floors to their inner edge 47 is made high enough above the floor to allow ore of any practical roasting depth to be conveyed along the floors of the retorts through them. In practice, commonly mined ores can be roasted at depths ranging anywhere from a portion of an inch up to two inches in depth, but some ores can be roasted when fed through the retort at a greater depth than two inches.

These track members, as well as the sides and the roof members of the retorts are preferably made of the very hardest and densest quality of grade B damper stock asbestos board, and it will stand a steady and much higher heat without being materially affected by it than they will ever receive in our retort, and it is a non-conductive material and will withstand the disintegrating action of acid gases of the ores for a good long term of years, and it is practically a non-heat penetrating and consequently a non-heat radiating material. All of these parts of the retorts, however, can be made of any suitable metal or metal alloys that will stand up to about 1500 degrees F., without being changably affected by it whenever it is desired to use metals, such as aluminum copper alloy, or German silver and nickel alloy or tungsten or nickel aluminum; hard cast iron can also be used, but soft cast iron will be apt, in about three years use, to require replacing on account of its tendency to be gradually attacked and disintegrated by the gases in the hot ore.

The floor members 37 of each one of the retorts can be made of cast iron or of any one of several different metals or alloys of metals, such as German silver, tungsten or aluminum alloy with nickel or any other metal or alloy that will remain straight and true to its form under a heat of about 1500° F., without bulging or chipping or cracking or sagging. We do not use such a high heat when roasting ores, but a careless operator might carry the heat of the furnace up to near this heat and if a material was used in the floor that would not stand this heat, the floor might bulge, sag, warp or blister out of shape.

We can also use any plastic material that can be moulded and baked into slabs or blocks. We preferably use, however, thick fire clay slabs, and in order to facilitate the removing of them and the replacing of them in the furnace in case of their cracking or warping, we make them in lengths of preferably five feet long for the two center lengths of the floor portion of each retort, and thirty inches long for the opposite ends of the floor of the two retorts, as these lengths fit exactly into the distance between the center of the middle castings of the rows B and BB and C and CC and the center of the opposite end castings B1 and BB1 and B3 and BB3 and C1 and CC1 and C3 and CC3.

The fire clay floor slabs 37 of the two retorts are provided with stepped overlapping ends as illustrated in the fragmentary view Fig. 15C and these joining ends rest on brackets or lugs 51, that project inwardly from the blocks 52, through holes 53 formed in the wall R, and the opposite ends of the floor slabs rest on the lugs, as these lugs 51 of the blocks 52, are made to project a short distance underneath the opposite side edges 36A of the floor slabs; and these floor slabs are not supported anywhere throughout their length except at their joining ends, in order that the heat from the burning of the coal or oil or gas will heat them to their opposite outside side edges equally as hot as it will heat the central portion of the floor slabs, between their opposite joining end portions, which for five inches of their length at each end, rests on the lugs 51.

The blocks 52 and their floor supporting lugs are slidably mounted in open recesses 54, that are formed in the lower flanges of the outside wall castings B and BB, and C and CC, between upward projecting lugs 55, that are cast on the flanges of these two rows of outside wall castings, but while the blocks are slidably mounted between the lugs 55 in the open recesses 53, they rest on top of the flanges of the wall castings below them, thus the sliding block 52 between the lugs 55 of the middle row of castings B and BB rest on top of the upper flanges of the foundation wall castings A and AA, and the sliding block 52 of the upper row of castings C and CC rest on top of the upper flange of the middle rows of castings B and BB.

One of the most essential, and we believe entirely new and novel feature of our ore roasting retort furnace, resides in and consists of their construction in such a manner that the floor members of our retorts can be taken out of the retorts and out of the furnace whenever any one of them cracks, blisters, bulges or warps out of shape, without in any way removing from the retorts or from the furnace, any part of it, not even the rabbling mechanism; and we accomplish this feature by supporting the overlapping end portions of each floor slab in each of the floors of the two retorts upon projecting brackets or lug end portions 51 on sliding blocks 52, and the sliding blocks 52 are rigidly and permanently secured against accidental movement, but at the same time they are arranged to be moved backward to release any one or more floor members whenever, from any cause they require to be removed; and while there are a number of ways in which we can make and apply this feature of our invention, we preferably construct and arrange its several parts as follows: Each sliding block 52 that supports the floors of the upper and the lower retorts is provided with a vertical standard portion 57, that is provided with an outward projecting hub 58 which is provided with a large aperture 59 through its center. A hole 60 is then drilled through the cast iron wall R, centrally between its lugs 55, and at a point above the bottom of the sliding block to be in axial alignment with the central hole through the hub 58.

We then clamp a short shaft 61, which is provided with threads at its opposite ends, to the iron wall R in such a manner that it clamps the track member 44 of the retort and also the asbestos side walls 38 and 39 of the retort against the inside surface of the cast iron wall plate R, as will be described in detail hereinafter; and also at the same time we clamp the shaft 61 to the iron wall R, so that it will project out from its front side R1, at right angles to it and in axial alignment with the aperture 59 through the hub 58 of the sliding block 52 so that when the sliding block is inserted in its recess 54 between its lugs 55 and is pushed up against the outside surface R1 of the wall plate R the aperture 59 in its hub 58 will pass over the shaft, as the aperture is made of a large enough diameter to fit easily over and around the shaft and thus to allow the sliding block to move slidingly back and forth when moved inward under the floor members to support them or when moved backward from underneath the floor members to release them, and to allow them to drop or to be lowered and removed from the retort and from the furnace through the large doors entering into the heat and smoke conducting flues therein.

This shaft 61 is a short shaft that is made in two different diameters U and V with a collar 62 between them and the smaller end V of it extends loosely through the hole 60 in the cast iron wall plate R, and also loosely through a hole 6B drilled through the asbestos side lining plate 38, and its inner end is threaded and is threaded into a nut 64 that is set into and secured to the asbestos track member 44 in case the track member is made of asbestos, but in case the track member is made of metal, the nut 64 is dispensed with; and then a threaded hole is made in the track member into which the threaded end of the shaft is screwed until the collar portion 62 of the shaft bears tightly against the outside surface R1 of the cast iron wall plate R, and in order to turn the shaft screw into the track members and very tightly against the outside surface of the wall plate, its outer end is provided with a wrench receiving surface 65, preferably of octagonal shape that is formed on its end within the diameter and circle of its largest end and a wrench is applied to it to turn the shaft into the track nut and very tightly against the outside surface R1 of the cast iron wall plate R, which draws the track member and the asbestos side plate 38 tightly up against the inside surface R2 of the wall plate R.

The shaft 61 then projects rigidly from the outside surface R1 of the cast iron wall plate R and never has to be loosened except when the track member 44 has to be repaired or replaced, or a floor member has to be replaced by a new one.

When first erecting a retort each two oppositely positioned sliding blocks 52 are placed in their recesses 54 and the apertures through their hubs 58 are pushed over the shaft 61 around which it fits loosely and the inner surface of each sliding block is provided with a counterbored recess 67 that fits freely over the collar 62 of the shaft screw which allows the inner face 68 of the sliding block to bear against the outer face R1 of the cast iron plate R. Then a large nut 69 is threaded onto the outer threaded end of the shaft screw and is turned up against the hub 58 of the sliding block 52 and is tightened with a wrench to very rigidly clamp the sliding block to the outside face R2 of the cast iron wall plates R of the row of outside front and rear wall casting B and BB and C and CC, as the sliding blocks 52 extend in underneath the floor member of both retorts E and F, from opposite sides of the furnace, that is, from its rear side as well as its front side, consequently it can be plainly seen that the shaft screw performs the double function of first clamping the track member 44 and the asbestos side members 38 and 39 of the retorts to the inside surface R2 of the wall plate R, and then by the additional means of the large nut 69 clamps the floor supporting or releasing block to the outside surface R1 of the outside wall castings B and BB and C and CC of the furnace and thus clamps all of these members of the furnace and the sides of the retorts very rigidly and permanently together and they are never loosened or removed unless repairs or replacements are necessary to the floors or the track members.

In case it is necessary to replace a damaged floor section from any cause, it is not necessary to remove the shaft screws on the opposite sides of the furnace in order to move the sliding blocks from underneath the damaged floor section or slab, it is only necessary to remove the large nut 69 from its outer end and then turn the shaft to unscrew it just far enough to force its collar 62 against the shoulder 70 of the counterbore recesses 67 in the sliding blocks 52 and as each shaft screw is unscrewed, its sliding block will be moved backwards slowly and this backward unscrewing movement of the shaft screw need only be continued until an operator can get his fingers behind the sliding block on its opposite sides of it and between it and the wall plate R, then he can pull the sliding block back in its guideway recess 55 until its bracket lug 56 has moved backward from underneath the floor slab that is to be removed and in order to clamp the outer end of the sliding block down in its recess and to the top of the flanges of the cast frame on which it rests and also to prevent its being pulled off of the flanges and out of its recess between its lug 55, we provide its top surface centrally of its width with a long slot 71 down through the outer end of which we extend a cap screw 72, the lower end of which is threaded into a thick lug 73 formed on the underside of the upper flange of the adjoining outside wall castings A and AA and B and BB and the head of the cap screw bears on the top surface of the flat body portion 52 of the sliding block and clamps it tightly down onto the flange on which it rests, and when it is necessary to draw the sliding block from underneath a floor slab, this cap screw does not have to be removed, but simply loosened enough to allow the block to be drawn back underneath it until the cap screw reaches the opposite end of the slot 71, and consequently, the cap screw, by clamping the outer end of the block down, not only prevents the outer end of the block from tipping up and its brackets 56 from tipping down at a slight angle underneath the floor slabs, but it holds the brackets in a true horizontal position underneath the floor slab and causes the underside of the fire clay floor slabs which are smooth and straight across to rest evenly across the top surface of these supporting brackets 51.

The bracket lugs 51 of the sliding blocks 52 are preferably made to extend about four inches underneath the opposite side edges W of each floor block. The adjoining ends of each two floor slabs rests on top of these bracket lugs 51 of the floor supporting sliding blocks 52 and they rest on it for about five inches of their length, and at the same time the abutting ends of the fire clay floor slabs are provided with overlapping step portions $t$, and consequently the ends of each two blocks fit together with an overlapping extension portion that brings their top ore roasting floor surfaces and also their underside surface in alignment with each other as illustrated in detail in Figure 15C.

The roasting treatment that we give to refractory ores in our roasting retort furnace, is what is known among metallurgists as a muffled roast, that is, the fire and flames and the monoxide, dioxide and all other obnoxious and deleterious gases and the smoke of combustion that comes from the burning of coal or oil or gas or other fuel with which to heat the furnace and the retorts while they flow directly up against the bottom of the floor slabs of both retorts, do not flow into the ore roasting chambers of the retorts which is in the space formed between the floor 37 and the roof 36, and the opposite side boards 38 and 39 of each retort, but the heat only, that is generated by burning the fuel does flow up through the floors of the retorts into the ore roasting chambers of the two retorts E and F. A little heat flows down through the roof 36 of the retorts E and F, from the flues G, but the asbestos side board members and the roof members when composed of asbestos keep the heat that flows into the ore roasting chamber up through the fire clay floor members from radiating out of the ore roasting chambers.

The cast iron walls R and the flanges of the front and rear outside wall castings A and AA, and B and BB and C and CC, are naturally heated quite hot by the fires in the furnace and they heat the outside portions of the asbestos side and roof plates and assist them to retain the heat within the chambers of the ore roasting retorts that flows into them up through the fire clay floor of the retorts.

The object of the roasting treatment that we give to ore or oil shales, each of which must be roasted entirely separate from the other, is given to them for the purpose of volatilizing and eliminating the sulphur, arsenic and the antimonial and other deleterious volatile elements from them, which being practically effected by our roasting treatment changes the sulphides in the ores or in oil shales to sulphates and then we subject the roasted sulphate ore or oil shale to chemical and mechanical treatments as are necessary to recover from them the platinum, gold, silver, copper, lead, zinc and other valuable metals and metalloids that occur in them in value enough to be economically recovered; and in the case of the treatment of oil shale, we can conduct the elements that are in the oil shale that volatilize into oil gases under our roasting treatment from both retorts to a condensing apparatus through valve controlled pipes X and Y, that extend from the rear side of the retorts and furnace to condensing apparatus where we can recover from them gas and oil ammonium sulphite. We do not illustrate the condensing apparatus as it does not form a part of our invention.

When roasting ore, however, that contains such a low percent of sulphur, arsenic, antimony, quicksilver and such other valuable elements as are not worth recovering, these gases are allowed to escape to the atmosphere through the valved pipes 76 that are connected to the pipes X and Y at their lower ends and are connected to the flue pipes, J, K, and M and O at their opposite ends, see Figure 6.

In roasting ores or oil shales for the purpose of changing their hard crystallized sulphides to soft soluble sulphates we use any degree of heat from about 250 up to about or over 1000 degrees F. The greater portion, however, of the platinum, gold, silver and copper ores mined, require only from between 300 to 500 degrees F., depending on the character of their refractory elements, but some characters of lead and silver ores require from about 600 to 800 degrees F., and some complex rebellious ores may require from 800 to above 1000 degrees F.

The success of our roasting treatment for not only the general run of refractory ores, but also for the most difficult complex and rebellious ores, that are mined throughout the world for such valuable metals as platinum, gold, silver, copper, lead, zinc, uranium, antimony, potash, quicksilver and other valuable metals and metalloids as well as the oil shales, where in addition to extracting the oil from them it is desired to recover the platinum, gold, silver and other metals that may be in them, as well as the ammonium sulphate, potash and such other by-products as they may contain in paying quantities; besides in the application to the ores or to the oil shales while roasting them of a sufficient amount of the oxygen of atmospheric air, as the oxygen of the atmosphere when air is admitted to the ores unites with the chemical elements and salts in the ores or oil shales and effects the chemical change in them that changes them from sulphides to sulphates.

All ores or oil shales, however, before being fed into our retort have to be crushed and granulated or pulverized; the granulated products may be from about one fourth to forty screen mesh size and the pulverized products may be from about fifty to about 150 screen mesh size, but the size of the ore or oil shale granulated or pulverized product should be that size that is found best to obtain a perfect roast from, after making a series of roasting tests in small roasting dishes in a muffled assay furnace such as the muffled fire clay assay furnaces in common use by assayers.

The temperature of the ore or the oil shale at the time the oxygen is admitted to it, is a matter of very great importance, and it depends altogether on the character of the ore being roasted, as some ores or oil shales will undergo the chemical change from hard crystallized sulphides to soft soluble sulphates, at temperatures ranging from about 250 to 500 degrees F., while others require from about to above 850 degrees F. Thus assuming a dry ore is being fed into the retort, it will travel a short distance into the upper retort before it has been heated up to between 250 to 500 degrees F., and the oxygen should be admitted to it at between this range of temperatures and it should be continued preferably uninterruptingly until the ore has taken up or absorbed all of the oxygen that it will hold, consequently the air should be fed into the ore chambers of both of the retorts into the ore or the oil shale as long as it is needed to complete the chemical change in the ore or oil shale, from hard insoluble sulphides to soft soluble sulphates.

Consequently the ore or the oil shale being roasted passes through a gradual and progressive volatilizing, oxidizing chemical changing treatment.

Different characters of ores and oil shales, however, require different periods of time in which to roast them, for instance, some of them will roast in about ten minutes, others require about twenty minutes, others require about thirty minutes and there are a few ores that would require from about 40 or 50 or 60 or more minutes in which to roast them, and also some require more oxygen than others and there are some ores that require the application of oxygen to them for a longer period of time than others, consequently, the best roasting results are obtained after the ores or oil shales have been analyzed and their chemical and metal values and the number of them has been determined by the metallurgical chemist and assayer; and in order that he may be able to quickly and easily secure samples of the roasting ore or oil shale, we provide the front of the furnace and of the retorts with doors 76, that are large enough for him to insert his head when necessary to see just how the rabblers are working and the ore is progressing towards a perfect roast, which he soon learns to judge quite closely from its changing color; and he is also able to very quickly secure from the roasting ore as many spoonfuls of it as he desires, and he can test these samples and thus accurately ascertain the condition of the ore and determine from the samples tested, whether or not more heat or less heat is required and also when oxygen is needed and when the ore has taken up all of the oxygen it requires to make the chemical change in it from sulphides to sulphates. The metallurgical chemist thus has perfect control of the ore from the time it enters the retort until it discharges from it.

The doors 76 are also especially designed for the admittance of a large volume of air quickly into and against the ore being fed through the ore roasting chambers of both retorts into the upper retort first intermittently through either one or two or all three of its doors and following up its admittance into the upper retort by admitting it into the lower retort to the extent it is needed there, through the door 76 nearest to the end of the lower retort where the ore drops into it through the chute 77 from the upper retort and then through the middle door of the lower retort if it is required in the ore at the middle part of the lower retort, and finally through the last door if it is still required to complete the change in the ore from sulphides to sulphates as this last door is within two feet of the discharging end of the lower retort, consequently as often as oxygen is required in the ore of either the upper or the lower retorts, the ore chambers of both of them are flooded with atmospheric air, either cold or hot, and the air is compressed with pressure enough to cause it to move fast into the ore chambers and against the ore being fed through them along the floors of the retort from their ore entering end to their ore discharging end, and the oxygen from the air is very quickly absorbed and unites with the chemicals and salts in the ores and acts in combination with the low degree of muffled or indirect heat and the turning over rabbling movement we give to the ore to allow the oxygen to penetrate through it and to assist in chemically changing its sulphides to sulphates.

In addition to the doors 76 for admitting oxygen or steam to the ore, we provide fixed atmospheric air conveying pipes PP three being shown along the length of the furnace in Fig. 9, extending into the outside wall castings into and across the ore chambers of both retorts and they are connected outside of the retorts and the furnace to valve controlled air and steam pipes 78 and 79 leading to and connected to a supply of compressed air under pressure enough to flow to the ore through apertures PA in the underside of the pipes PP placed to register intermittently with openings 80 extending through from the outside of the hub portion 82 of ore rabbling rolls RS, through their spokes 83 to their ore shovelling up and forwardly moving blades 84 which act on the ore to cause it to turn over and over on itself and they discharge the pressure driven oxygen directly into it and its pressure forces it into and through and mixes it with the ore as it is moved along the floors of the retorts by the rabbling rollers as will be more fully described hereinafter.

When roasting oil shale, however, instead of admitting air to the upper retort, except possibly in a small amount, we admit steam through a valve controlled pipe 79 that leads to a supply of steam which acts to soften and disintegrate the oil shale and it prevents it from sticking to the rabbling wheels and it also acts to cause the volatile elements in the oil to move quickly. A little steam can also be used in the lower retort, but mostly air is used there when roasting oil shales, and in treating ores or oil shales, air can be used intermittently if desired instead of continuously, but the best results will be obtained on most ores if it is used continuously until the oxygen unites chemically with such chemicals as are in the ores that it will unite with. After the ore or oil shales has been roasted, all volatile elements in it have been volatilized into gases that have flowed out of the retorts through the side outlet pipes X and Y either into the chimney or condensing apparatus while the platinum, gold, silver, lead and other metals have been freed from their sulphur and other deleterious volatile elements as well as their gangue matter with which they were associated in the ore or oil shale and they can then be easily recovered separately from each other by well known chemical solutions and precipitants and also by well known mechanical means; while the copper and the zinc have been chemically changed to a condition in which they can be economically recovered; the copper as sulphate of copper or bluestone and the zinc as white vitrol.

The chemical solutions and the mechanical treatments that are used to recover the values from our roasted ores or oil shales do not form a part of our present invention, and the machinery also that is used for crushing and granulating and pulverizing the ore and the oil shales does not form a part of our present invention as any of the best crushing, granulating or pulverizing and drying machines now used in ore treating mills can be used for this work of preparing the ore or the oil shale for our roasting treatment.

While our invention contemplates the use of any type of ore pushing or dragging or forwardly moving or feeding plate or blade or block form of ore rabblers or mechanism we have preferably invented an intermittently rotating type of forwardly feeding and rabbling mechanism and consequently we provide the interior of our ore roasting retorts with an endless and continuously forward traveling and ore moving and conveying rabbling mechanism that feeds the ore through the retorts from their ore receiving hopper 86 at the end 87 of the upper retort to the ore discharging chute 88 at the discharging end 89 of the lower retort.

This endless and continuously forward ore conveying or feeding mechanism consists of a plurality of cross rods 90, that extend across both retorts and they have beveled wheels 48, secured on their ends by split pin 92 that extend through them and the rods; and the beveled wheels are mounted on the beveled faced tracks 44, and upon the cross shafts 90; ore rabbling rollers RS are very loosely mounted, and the cross shafts 90 are connected by flat thin links 93 that are mounted on the hubs of the beveled wheels 48 from one cross rod to the other throughout the length of the endless ore conveying and rabbling mechanism.

This endless ore conveying and rabbling mechanism extends beyond the opposite ends of the retorts and of the side wall castings of the furnace and it is mounted at its opposite ends on sprocket wheels 94 that are secured to shafts 95 which are journaled in boxes 96 that are supported on brackets 97 that are secured to the opposite ends of the furnace and the boxes 96 are longitudinally adjustable on the brackets between vertical lugs formed thereon by cap screws 98 and the boxes are adjusted by the cap screws which are threaded to the lugs and bear against the opposite sides of the boxes to move the sprocket wheels, which can thus be adjusted to keep the endless conveyor at the proper tension on its track to run easily, and to, from time to time, take up the wear of the links.

The beveled wheels 48 are each provided with a long hub 99 and between the outside surface of each beveled wheel and the split pin 92, two apertured ends 9A of the two flat thin links 93 are mounted loosely on the hub 99 of each bevel wheel, and these links extend in opposite directions and are mounted on the hubs of the beveled wheels on the cross shafts 90 throughout the endless length of the ore conveying and rabbling mechanism.

Each one of the rabbling rollers RS consists of a circular form of a roller that has four equidistant gaps 85, formed in its peripheral surface that are of the same width and extend in to the hub 82 of the roller which extends the whole length of the roller and from which four spokes or arms 83 extend to four solid peripheral portions which are formed into ore rabbling shovels 84. Each shoveling blade 84 of each ore rabbling wheel consists of a thin peripheral segment of the circular form of the wheel and on its inner peripheral surface it tapers from the center line in opposite directions to a thin shoveling edge EL at the opposite ends of its length and the inner peripheral surface of this double taper is formed into corrugations 9B with round bottomed and top members so that as the blades move down into the ore and through it, the recesses of the corrugations will fill with ore and they will retain the ore in these corrugations until the shovels move upwardly as the rollers turn and then the ore will slide out of them back onto the top of the ore on the floor of the retort.

The gaps are made a little longer than the shovel members in order to leave a wide space between their edges to allow the spokes to move against fixed rods FR as their rollers are drawn along through the retorts and are turned up by the fixed rods, which allows the spokes to engage the fixed rods as the rollers are moved through the retorts; at three different points, however, in the length of the retorts; the rollers engage perforated pipes PP through which compressed air is admitted to the interior of the ore roasting chambers of the retorts and to the floors of the retorts as will be presently explained. These air or steam admitting pipes PP act to turn the rabbling rollers RS, just the same as the fixed rods FR do, and the rabbling rollers each have four spoke arms 83 that extend from the hub to the outside circumferential edges of each of the shovel blades 84 and the rods FR, and pipes PP are engaged by the arms 83 close to their hubs 82 at their first contact with them as shown in Figures 10 and 11, then as the rabbling rollers are moved along through the retorts, the arms remain in contact with the rods which causes the wheels to turn until the arm passes from underneath of the rod it engages; and each rabbling roller owing to its striking against each rod FR or air inlet pipes PP, is intermittently turned one quarter of its full rotative movement, and each one of the rollers remains in mesh with a rod FR at its rear end until it moves into mesh with a rod FR ahead of it as it is moved along the floors of the retorts.

The fixed rods FR and the air inlet pipes PP which are engaged by the spokes 83 of the rabbling rollers RS, are in the retort furnace illustrated spaced four inches apart throughout the length of the two retorts and the ore rabbling wheels are about seven and one eighth inches in diameter, and this relative relation between the distance between the rods and the diameter of the ore rabbling wheels allows them to make a full revolution every foot of their travel through the retorts.

The ore rabbling rollers RS extend all the way across the width of the floors of both retorts and close up to the sides between the tracks 44 and while we could use either two or three or four of them mounted on the cross shafts 90; we preferably use only one as shown in the cross sectional view of Figure 9A in the lower retort, but we show three of them each made of a length to allow the three to extend across the full width of the floor of a retort in the upper retort, see Figures 9A and 13; and the only advantage of using more than one is, so that any one of the wheels could be raised a quarter of an inch by any lump of ore or material that might fall as it is fed into the upper retort without disturbing the bearing of the other wheels on the floors of the retort.

The hubs 82 of the wheels are provided with an axial bore 8A of about a quarter of an inch larger diameter than the diameter of the shafts 90 upon which they are mounted in order that these rabbling rollers RS can rise and fall gradually on them, as they are moved through the retort, as will now be described in detail: Thus assuming, that we are roasting ore that is two inches deep across the full width of the floors of the retorts, the rollers RS are mounted on and moved continuously forward through the retorts by the shafts 90 of the conveyor which extend forward in the direction of the arrow AR the front edges 9E of the spokes strike against the fixed rods FR which causes the rollers to turn backward to allow the spoke that has moved against the fixed rod to pass underneath it and as the rollers are turned, each shovel 84 of the rollers moves down through the ore against the floor of the retorts as they are intermittently rotated by their contact with the rods FR as the conveyor moves them forward continuously against and under them; for example, see Fig. 11; where the edge E1 of the shovel is in contact with the floor 37 of the retort at the point PA and the edge 9E of the upper rear spoke 83A has been moved against the fixed rod which we will mark FR1, for this example, and must pass under it and also it should be noted that the bore 8A of the hub 82 rests centrally around and against the shaft 90 which is the part of the conveyor that pulls the ore rabbling roller along, and the roller rests on the floor of the retort by its own weight; then as the conveyor shaft 90 moves the roller along the floor of the retort, the edge E1 of the shovel scrapes along the floor of the retort pushing the ore ahead of it and at the same time shoveling up a shovel full of ore as it travels about two and a half to three inches along the floor through the ore to the point PB, where the center 9A of the length of the outside surface of the shovel rests flat down on the floor as shown in dotted lines, the shovel having moved to this point PB and then the corrugations 9B in its upper surface are full of ore, and the bore 8A in the hub is still about centrally around the shaft 90, and at this point the upper spoke 83B of the roller stands with its edge 9E1 moved against the fixed rod FR2 and as the roller is drawn along, this upright spoke is turned backward underneath this fixed rod FR2, and as the roller turns at this point of the floor, the edge E1 of the shovel commences to move upward away from the point PB and it carries its shovel full of ore with it which is held in its corrugations up above the surface of the top level line LL of the ore in the retorts, but as the shovel moves rotatively upward the opposite edge OE of the shovel stays down against the floor until it reaches the point PC on the floor underneath and in line with the vertical center of the fixed rod FR2, when it leaves the floor as the roller rotates and travels up through the ore on the floor and the ore in its corrugations commences to slide off of it gradually, and by the time the shovel has turned upward a short distance above the ore, all of the ore in its corrugations has run out of them back onto the ore on the floor, and as the shovel comes up out of the ore in its upward turning movement, the ore at the top of the body of ore LL on the floor of the retorts rolls down onto the floors and thus the ore which is dry as powder and of fine granulation is turned over and over on itself by the floor engaging and shoveling up movement of the shovel members of the rollers; then as the shovel E1 travels upward, the shoveling point E2 of the next shovel member of the roller moves down through the ore against the floor at about the point E2 below the fixed rod FR2, and in this position the top edge of the bore through the hub rests loosely on top of the cross shaft 90 and then this shovel E2 curves down through the ore and its shoveling point E2 drags along the floor just the same as the shovel ahead of it did, pushing the ore ahead of it and shoveling up the ore from off of the floor and carrying the ore in its corrugations up through and above the ore; and the ore on top of the shovel and in its corrugations flows downward and backward onto the ore on the floor while the upper spoke is moved against the fixed rod FR3 which turns it over backward underneath it as it is drawn along by the conveyor, and at the same time the shoveling edge E3 of the roller moves down through the ore against the floor to the point PD directly underneath the fixed rod FR3 along which it scrapes to the point PE where it turns up from the floor and the shovel E4 moves down against the floor directly underneath the fixed rods FR4, and it shovels along the floor the same as the other shovels, thus all four of the shovels have shoveled up ore from the floor of the retorts and the roller has made a complete revolution in sixteen inches, as the fixed rods are preferably illustrated as being placed four inches apart. When the bore in the hub arrives centrally of the vertical line through the fixed rod FRD, the lower shovels will stand as shown in the dotted lines at PE and PF, and then the top of the bore through the hub is resting down centrally on top of the cross rod 90. It is only necessary to have the bore through the hub enough larger than the diameter of the cross shaft 90 to allow the shovels of the rollers full play to engage and scrape along the floor and push the ore ahead of them a distance of about two and one-half to three inches, at the same time they are shoveling it up; of course the fixed rods FR, could be placed further apart than four inches, but it is essential that the spokes be under the control of the fixed rods so that the spokes of the rollers do not leave the fixed rod at their rear end before they have moved in position to engage a fixed rod FR ahead of them, in that way, by placing the fixed rods close enough together to accomplish this, the spokes of the rollers are practically all of the time under the control of two fixed rods FR, which mesh into the gaps between the spokes in practically the same order as gear teeth mesh into each other.

The bore 8A of the hub 82 is arranged to give a little clearance between its lower edge 8B and the lower edge of the cross rod 90 to permit a little vertical movement there, in case any slight hard material might get underneath a shovel.

Each shoveling blade 84 or each ore rabbling roller RS consists of a thin peripheral segment of the circular form of the roller except that its outside peripheral surface is flattened across the center of the length of each shovel tangentially in order to allow the edges of the shovels to bear on the floors of the retorts when the shovels move down flat against them as shown at the center vertical line PB on Fig. 11, furthermore each peripheral shovel member of each roller is a double ended shovel as they taper on their inner peripheral sides from the center radial line 9F of each spoke to their opposite ore shoveling edges and this inner peripheral surface of these double shovels is formed into deep corrugations 9B in order that each shovel will retain the ore it shovels up as it moves along the floors of the retorts; these peripheral portions of the rollers have to be formed into double ended shovels because when the conveyor travels over their supporting sprocket wheels at the opposite ends of the retorts, the rollers reverse the directing of their rotative movement and the opposite edges of the shovels from those that rabbled it in the upper retort, rabbles it in the lower retort.

The center of the length of each double shovel where the air and steam passageways come through them, is provided with a longitudinal groove 9J that extends the whole length of the outside surface of each double shovel member of each roller, see Fig. 10, which permits the air or steam to travel along and discharge along the whole length of each roller against and into the ore on the floor of both retorts, and this arrangement allows the use of short fixed air or steam admitting pipes PP through the outside wall castings and into the retorts that are just long enough to extend past the adjacent spokes of each roller which are placed close to the beveled wheels 48, and the air or steam flowing from either the air pipe 78 or the steam pipe 79 into these short pipes PP, the inner ends of which are closed by a plug PS, flows out of them through the aperture PA in the lower side of the air or steam pipe PP into the air or steam passageways 80 formed into the outside surface 81 of the hubs 82 and extend into a circular groove 80A that surrounds the bore 8A in the hub and from this concentric groove 80A the air or steam flows through the radial holes 80B formed through the spokes 83 and the shovels 84 into the longitudinal groove 9J and from it against and into the ore as shown in Fig. 10. Of course the air or steam flowing into the several passageways in the spokes of each roller flows from them in four different directions into the ore chambers of the retorts, but some of it will flow directly into the longitudinal passageway 9J when a spoke is against or close to the floor of the retorts or close enough to discharge the air or the steam directly against or into the ore.

Either one or two or all the three perforated pipes PP in the upper retort can be used to admit steam into it when treating oil-shale as we would use far more steam in the upper retort than air, and might not need any air there with the steam when roasting oil shale, but it might be required alternately in small amounts with the steam.

Where more than one roller RS is used on a cross shaft 90, the fixed rods FR have to extend all the way across the retorts and through the outside cast iron walls, and they are provided with threaded ends and nuts and washers and the nuts are tightened against the outside surface of the wall R, and short rollers have to be used when two or three rollers are used and we preferably place the spokes in the center of the length of each short roller as shown in Figure 13, which also shows the fixed solid rods extending through and bolted to the outside wall castings.

When only one roller is used on each cross shaft, we preferably place spokes at the opposite ends of the roller and in that case the solid fixed rods FR can be very short rods that are just long enough to extend over and beyond the tops of the beveled track wheels and across the spokes 83 at the opposite ends of the one roller mounted on the cross shaft, as shown in Figure 14A.

In the case of the air and steam inlet pipes PP, where two or three or more rollers are used on a cross shaft 90, the air and steam inlet pipe PP would have to extend all the way across the retorts from the outside of the wall castings and their independent supply pipes 78 and 79. But where only one roller is used on a cross shaft 90, the air and steam inlet pipes PP, can be short pieces of pipe that extend from the inner sides of the asbestos side board of each retort to which they are secured by check nuts CN as well as check nuts CN1 threaded onto their outside end portions and turned up tightly against the wall R, of the outside wall castings over the tops of the beveled track wheels past the spokes 83 of one roller as shown in Fig. 9A, in which a fragmentary sectional view of both retorts is shown together with the arrangement of the independent air and steam supplying piping systems.

The combined air and steam inlet pipes PP extend out far enough away from the front wall castings B and C, to be connected to Y;

pipe fittings PF from which the valved controlled pipes 78 and 79 extend to a supply of air under pressure and a supply of steam and consequently the operating chemist and metallurgical engineer can use the air exclusively when roasting ore, or steam exclusively or with a little air when roasting oil-shale, by manipulating the valves V1 and V2, to shut off the steam and admit air, or to shut off the air and admit steam, or he can mix them if he desires.

There are two different ways of making the short fixed rods a part of the interiors of the two retorts, one of them, and the preferred way, is to cast a thin metal plate TP of nickel aluminum or other suitable metal and insert it between the track members 44 and the opposite asbestos side boards and make this thin metal plate wide enough to extend down and rest on top of the flanges T of the wall castings A and AA below the lower retort and also on the flanges FB of the middle castings B and BB below the upper retort; and form holes PH through them for the inner ends V of the threaded shaft 61 to extend loosely through, which would secure this plate against accidental displacement from between the track members and the side boards of the opposite sides of the retorts, see Figure 14A in which fragmentary views are shown of the inner side elevation of this fixed rod FR supporting plate TP and also a plan view 14B and also in Figure 14C an end elevation of it between the track 44 and the asbestos end board and the outside wall casting, showing the sliding block 52 in place with the threaded inner end V of the shaft screw 61, extending loosely through the hole PH, thus not only securing this plate and its fixed rods FR against any possible lifting up and disarranging movement.

This fixed rod FR, supporting plate TP is preferably cast in three equal lengths each being of exactly the same length as the outside wall castings and each casting is clamped at the center of its length, together with the track member 44 and the asbestos side board 38 by the threaded end V of the shaft screw 61 against the inner side R2 of the outside wall casting R, and consequently the three castings of this fixed rod plate are placed end to end against each other between the track and the asbestos side board and they extend the whole length of the two retorts, and at the opposite ends of the two retorts, short curved pieces of these fixed rod plate castings TP are secured against the opposite sides of the hoods and are positioned as follows: The curved ends in alignment with the upper retort extending down to about the center of the hoods and the curved ends that are in alignment with the lower retort, curving upward to about the center of the hoods, as shown in Figure 14D. These curved end pieces of this fixed rod FR plate, keep the rollers in mesh with the fixed rods as the rollers are carried over the sprocket wheels from the upper retort into the lower retort and from the lower retort up into the upper retort.

The other way of establishing these short fixed rods FR, that turn the rollers intermittently as they move against them, is to combine the track member 44 and the short rod FR and its depending lug portion SP into a pattern and make castings from the pattern, of nickel, aluminum or any other suitable metal; we will then have the track and the roller turning rods FR in one integral casting as shown in Fig. 14C and a threaded hole TH is formed in the center of each five foot length of track portion of this casting to receive the threaded inner end V of the shaft screw 61 instead of the nut 64 shown in the asbestos track member 44. This combined track and short fixed rod member is also preferably cast in three five foot lengths and each length is clamped to the asbestos side board 38, and the inner side of the outside wall casting by the threaded end V of the shaft screw 61; and the three pieces extend the whole length of the retorts on each side of each retort as shown in the plan view, and short curved end castings can be made for the interior of the hoods of the combined track and rod members the same as of the rod and plate member. In Figs. 16 and 16A we illustrate a modification of our ore rabbling and intermittently forward moving rollers; this modification comprises the use of one-quarter of a whole roller and it consists of the hub portion and one of the spokes and one of the ore shoveling up and rabbling double ended shovels RS. The one-quarter double shoveling blade does not rotate, it simply hangs down with one of its shoveling edges E1 as shown in Fig. 15; as its spoke and its shovel blades are made heavy enough to sink through the ore to the floor and stay down against the floor and the shoveling member is moved through the ore on the floors of the retorts as they are moved along through the retorts by the conveyor; and when they reach the end of the upper retort, they fall off of its floor and swing out under the cross shafts 90 on which they are mounted and the shovel edge E2 if the shoveling blades that is opposite to the one that scraped along the floor of the upper retort, scrapes along the floor of the lower retort, and while the hubs of these one-quarter double shovel members fit loosely on the cross shafts 90 they only fit loose enough to swing freely on them to move by their own weight down into the ore and to stay there, and the ore flows over the top of them into and through their corrugations and out of them and off of them; the corrugations PB, of this one-quarter arm ore rabbling and forward moving arm, are not made as deep as those of the full circular roller, but as they are drawn through the ore it flows into the corrugations and it is turned over and over on itself.

This gravity ore rabbling and forwardly moving arm for feeding the ore through the retorts is less expensive to install than the rollers, and it is as nearly as efficient in ores of light weight and that only require from about ten to thirty minutes to roast.

The fixed rods FR are not needed with these gravity ore feeding and rabbling arms but the short air and steam inlet pipes PP are retained and they admit steam downwardly into the ore roasting chambers through the outlet apertures in their undersides, and the air or steam flows down to and is taken up by the ore while it is being rabbled and fed along through the retorts.

The motive power that rotates the ore conveyor consists of a pair of cone pulleys P1 and P2, provided with a speed defining ring 122 and with gearing 123 that permits different speeds to be conveyed to the conveyor from the cone pulley, as will be fully described hereinafter. The opposite ends of the ore moving and rabbling conveyor and their supporting sprocket wheels as well as the shafts on which the sprocket wheels and their journal boxes and the brackets that support them project beyond the opposite ends of the retort furnace, and they are all completely surrounded and enclosed by hoods 123 and 124.

Each one of the hoods are preferably made of sheet iron, but patterns can be made of them, and castings made of the patterns of either cast iron or any other metal, and if desired they can be lined with asbestos boards 128 to keep the heat from radiating rapidly from them, see Fig. 17. The largest piece 125 of each hood is of rectangular shape and at its inner and outer ends it is provided with flanges 129 that are bolted at their inner ends to the end plates 30 and 31 of the furnace by bolts 130; this rectangular portion projects from the ends of the furnace to the center of the sprocket wheels and their supporting shaft and its face stands vertically. This portion is also braced by braces HB that are secured to it and to the furnace and a two part segmental portion of a larger radius than that of the outer curved ends of the conveyors rabbling wheels and their sprocket wheels, is secured to the flanges of the outer end of the rectangular part of the hoods. This segment portion of each hood, however, is divided horizontally in alignment with the center of the shafts 95 of the sprocket wheels into two equal halves 126 and 127, and the lower half 127 which has flanges 132 along its inner edge is removably secured by bolts 131 to a flange 120 of the rectangular portion 125 and also by lug members 133 that are secured to the lower end of the hood members 125 and 127 by a bolt 134, which arrangement allows this lower half of the semi-circular part of the hoods to be removed when necessary to get at the lower part of the conveyor at its opposite end portions to remove and repair it.

The upper part portion 126 of the segment circular portion of the hood is pivotally hinged by a pin 135 and hinged lugs 136 and 137 one of each of which is secured to the rectangular part and the other to the top edge of the upper half part 126, and its lower horizontal edge is provided with flanges 136 that rest on top of flanges 137 of the lower part 127, while its inner edge is provided with a flange 138, that bears up against the flange 120 of the rectangular part of the hoods when it is removably secured down against the top flange of the lower part.

In order to provide a quick and handy method of removably securing the top part 126 to the lower part 127 and of quickly and easily releasing it so it can be swung up and back on its pivotal hinge and opened wide, we provide the upper and the lower meeting edge portions of these parts at their outside surfaces with lugs 139 and 139A which are secured to them, and we provide both of them with a vertical slot 140, in which a bolt 141 is placed, the lower end of which is pivotally hinged to the lower end of the lower lug by a pin 142, and to its upper end 143 we thread a winged finger grasping nut 144, which bears on top of the upper lug and by screwing this nut down on top of the upper lug, the upper part 126 is tightly secured to the lower part 127, and at the same time the inner vertical flanged edge of the upper part bears against the flanged vertical edge of the rectangular part, consequently the operator can very quickly and easily unscrew the winged nut by hand and swing the bolt out of its slot and then raise and swing the top quarter part of this semi-circular portion of either of the hoods, up and back against the top part of the upper corner portions of the furnace as shown in dotted lines, and then he can examine and adjust as often as he desires the operation of the conveyor and also of the oil burners OB, which are positioned in the rectangular part of the hoods and discharge their flames in the flue G, up against the bottom of the floor 37 of the upper retort, as will be fully explained hereinafter.

While our invention contemplates broadly the use of any differential speed applying mechanism attached to one of the shafts 91 of the conveyor sprocket wheels 94, preferably to the shaft at the left hand end of the furnace, nevertheless we preferably use the following described differential speed producing mechanism which consists of a pair of long tapering cone pulleys P1 and P2, see Fig. 17, that are mounted on shafts 14A, that are rotatively mounted on boxes 145, that are mounted in a supporting frame 146, and the frame is supported upon a standard 121 which rests upon the foundation of the retort furnace. The shaft of the lower cone pulley P2 is provided with a worm pinion 147, this worm pinion meshes with a worm gear 148 that is secured upon the end of the shaft 95 that supports the sprocket wheels of the ore conveyor of the retort; the two cones P1 and P2 are arranged opposite to each other so that the two cones together are of exactly the same size at their opposite ends and at a sufficient distance apart to clamp a ring 122 between them, that is, about three inches wide and is preferably made of leather; and by moving this ring 122 along between the cones, the speed of the lower cone can be changed, and in the length of the cones different speeds of the conveyor through the retorts can be obtained that will drive the ore through the upper retort F, from which the ore enters it through the hopper 86, through this upper retort F, and through the lower retort E to its discharge end in the different periods of time that has been found in the roasting of the generally mined ores to vary from about ten minutes for some ores to 15 minutes for other and 20 or 30 or 40 to 50 or more minutes for others, thus the cones provide a wide range of different speeds which give different periods of time in which an ore can be fed through the retorts and the chemist learns by testing an ore the period of time that is necessary to give to an ore to be fed through the retorts by the conveyor to give to it a roasting treatment that will chemically change its hard insoluble sulphides to soft soluble sulphates.

The shaft 144 of the upper cone P1 extends beyond its bearing and a belt pulley P3 is secured on it and a belt P4 is mounted on it and extends to a power driven pulley which we do not illustrate.

The ore as it discharges from the lower retort, falls into a chute, the lower end of which is provided with a gravity closing valve VI, which the ore opens as it falls through this chute, and the valve prevents air from flowing up into the lower retort, and the ore falls from this chute into a conveyor preferably a spiral conveyor S1, which preferably is a water-jacketed spiral conveyor from which it is conveyed through other conveyors to such chemical and mechanical treatments as are necessary to extract from the roasted ore, the platinum, gold, silver, copper, lead, zinc and such other valuable metals and metalloids as may be in it.

One of the most valuable of the new features of our non-heat radiating-ore-roasting-furnace, resides in the application to the bottom floor member of the upper retort F, of either oil or gas flame heat, as this feature is entirely new, and it is new and novel and of great value, because heretofore the upper retort or retorts where there were more than two of muffled ore roasting furnaces, have simply been ore drying and warming up retort members, because it has been found impossible to heat floor members of the upper retorts sufficiently hot to start any decided chemical change in the ore in them, and consequently all of the actual chemical change in the sulphides in the ore to sulphates, had to be effected in the lower retort, and it is for this reason that we have invented and applied to our retort furnace an entirely independent heating apparatus for heating the bottoms of the floor slabs of the upper retort F, which independent system of heating our upper retort could also be applied to one or two or more additional retorts placed above our upper retort F, with flues between them; if these extra retorts were equipped with ore conveying apparatus.

We can use either oil and oil burners or gas and gas burners OB, for heating the floor 37 of our upper retort, and in cities and towns having ore treating mills and having a gas supply, gas might be the cheapest, but we preferably illustrate oil supplying pipes OP and oil burners OB, arranged in the hoods 123 and 124 at the opposite ends of the retort and positioned to discharge their flames into the opposite ends of the flue G, along the bottom of the floor of the upper retort, and the flames and also the heat from the oil burners travel through the flue G, toward the outlet flue 19 in the center casting BB2 of the flue G, and consequently it flows in the same direction and with the heat and gases and smoke that enters the flue G, through the branch pipes J and K from the fire boxes 1, in the foundation castings A and AA.

We preferably show, however, four sets of oil burners in the flue G, in Figures 8 and 8A, to heat the floor of the upper retort, but more or less can be used if desired; and we also perferably show four sets of oil burners 150 and oil supply pipes 151 in the flue above the grates in the foundation castings A and AA, and the flames of the burners can be readily adjusted through the large entrance doors 5 that lead into the fire boxes and heat flues. Oil burners are shown in the heat flues in addition to the fuel burning grates as oil will be found cheaper than coal in some mining locatities for heating our furnaces.

We preferably use one, two or three oil burners, depending on their size. Three short flame burners will heat the bottoms of the retorts better than one long flame burner.

The arrangement of all four sets of oil burners is substantially alike for heating the bottoms of the floors of both retorts and it is illustrated in a fragmentary side elevation and a plan view in Figures 8 and 8A, and it consists of a main oil supplying pipe OSP and of oil supplying pipes and oil burners which are positioned at the opposite ends of the flues so that the middle burner discharges its flame along and under the center of the width of the floor while the other two are positioned to discharge their flames along and close to the opposite sides of the floor of the retorts, and we preferably use fan tail flame discharging burners in order that the three burners will discharge their flames all the way across the bottom of the furnace.

The main oil supplying pipe OSP, see Figures 8 and 8A, is positioned at the rear side of the retort furnace and it is adapted to be connected to any one of the several automatically operating oil filtering and heat and pressure applying machine and system apparatus in common use, which we do not illustrate. This main oil supplying pipe OSP is provided with branch oil supplying pipes BP that extend in opposite directions from it to the opposite end portions of the rear of the furnace and they are extended throughout the rear ash door plates DP (which are bolted to these doorways as they are not needed) into the ash pits, and then extend up through the fuel burning grates where a controlling valve CV is placed in front of the large door entrances and from which they extend to the opposite ends of the lower flue and then across it by a cross pipe 151 on which is preferably mounted three valved controlled oil burners 150.

Oil supplying branch pipes BPA extend from the ends of the branch pipes BP in opposite directions to the rear side of the hoods, from which pipes OSP extend across and through their opposite sides, and three valve controlled oil burners OB are preferably mounted on the pipes that extend across the hoods, and these oil burners can be easily reached and manipulated by the hand of an operator when the top segments of the hood are lifted and swung back as shown in Figure 8; and all of the oil burners are mounted on their supporting pipes so they can be swung up and down to adjust them at any desired angle to the bottoms of either the lower or upper floors of the retorts and also to enable them to be easily removed from their supporting pipes and cleaned whenever they need cleaning.

Electricity can also be used as a heating medium where its use would be cheaper than oil or gas or coal, and also there are ores that would roast quicker if electricity could be applied to heat them directly in the ore chambers of the retorts and at the same time by allowing an electric current to flow through them and thus assist in thoroughly heating and roasting them, and while our invention contemplates the use of any electrical heating apparatus suitable for this purpose we preferably show in Figure 9A in the lower retort only, as it would be applied to the upper retort in the same manner, a simple addition to the parts already used in the retorts that will heat and roast the ore within the ore chambers and cause a current of electricity to flow through it, and the additional parts are as follows:—A thin metal plate 37A is laid down on top of the fire clay floor slab and acts to protect its upper surface against the wearing effect of hard sharp gritty particles of ore when that class of ore is to be treated, but it is not needed on some ores except we desire to heat them electrically within the retorts, then this plate becomes an electrode and is used within the retorts to heat the ores and it consists of a thin flat smooth surfaced plate 37A and it is shown in Fig. 9A and also in Figures 8 and 18, and it is made of any electric current conducting metal that offers resistance enough to an electric current to be heated up to about one thousand degrees F., and which consists preferably of German silver or nickel aluminum or some other electrically conducting and heat developing and transmitting sheet metal; and when this plate is used, it acts as an electrode and the air and steam inlet pipes PP can be made of hard copper or any other conducting material, and be insulated from the rest of the piping by non-conducting members PPO, and the fixed rods FR can be made of hard copper or any other conducting material and be also insulated by the same or other non-conducting members PPP whenever necessary, and a circuit wire PPA is extended from a source of current supply CS and is connected to them, and these conductive members discharge the electric current into the hub members 82 of the rabbling rollers which rabbling rollers are also cast of nickel aluminum or German silver or some other electric current conveying heat resisting and heat transmitting material that is capable of being heated up to about one thousand degrees F., and the current flows through the rollers into the floor electrode plates 37A and it also flows into and through the ore on this metal electrode floor plate as the ores are fed through the retorts, and then no heat at all or only a little heat will be needed underneath the floors of the lower or the upper retort to satisfactorily heat the retorts to roast the ores.

Such parts of the pipes PP and of the other parts of the retorts and furnace apparatus as requires it will be insulated so as to confine the current to the rabbling rollers, and the plate 37A and the current travels along and through the rollers and from them through the plate and out from it through a circuit wire PPB that extends through the opposite side of the furnace from the side the current enters it and leads to a ground PPC.

If only a sufficient amount of electric current is used in the rabbling wheels, the plate and the ore, to evenly distribute the heat through the ore, its use on some ores will give a more even and thorough and consequently a quicker roast than the heat alone coming up through the fire clay floor slabs.

The metal floor plates can be a sheet of metal the full length of the floor of each retort and of the full width of each retort, or they can consist of several pieces of sheet metal placed end to end on the fire clay floor slabs, and inasmuch as only a heat of from 300 to 500 degrees F. is required for most all of the generally mined ores and only from 600 to 850 degrees F. for the most complex and refractory ores, the application of electricity in the retort, as the ore roasting medium is simple and practical and especially where the retorts are made of non-conducting material.

In Figures 19 and 19A and 20, we illustrate an ore roasting retort furnace that is a modification of the one we illustrate in the preceding figures, and it will be as highly efficient in the volatilization and desulphurization of most of the generally mined ores roasted in it, and it is of much cheaper and simpler construction, and for that reason it is better suited to the economic conditions of small mining companies. Fig. 19 of the views of this furnace, illustrates a longitudinal sectional view of it, and it consists of oppositely positioned brick supporting side and end walls 152. In particular, the inside layer 152A is fire brick, then a layer of other heat insulating material 152B which extends up to the top of the brickwork and prevents the heat generated within the furnace from radiating out of it or from its retorts through its side and roof members and then an outside layer of common brick 152C.

Within the brick side walls we construct two ore roasting retorts 153 and 154 of cast iron or other suitable material and an endless ore rabbling conveyor 155 travels continuously through the two retorts, the detail construction of which will be presently described.

In this Figure 19 furnace, we place the fuel burning and retort heating fire box 156 in the center of the length of the furnace and below the lower retort 153, and from this fire box we extend flues 157 in opposite directions to the opposite end portions of the furnace where these two flues connect with the lower end portion of two by-pass flues 158 that are hollow pipe members made of cast iron and they are built into the brick work, and in each of the lower ends of these two by-pass flues a hand operating slide valve 159 is slidably mounted, the handle rod 160 of which projects through the brick wall and far enough beyond it to be grasped by the hand of an operator; and the by-pass flues pass the heat from the combustion chamber to the flue above, and each one of the by-pass flues is fitted with a kind of a gate valve so arranged as to throw heat both ways or divert the heat to either end of the retort as may be desired in treating ores or shales.

The handle 160 of the valve extends through a pipe that is inserted in the brickwork and the end of the handle rod 160 of the valve is provided with a hand grasping member 161, preferably of loop form.

The valve 159 corresponds to the dampers DF in flues J and K of our asbestor retort furnace in its heat evening action.

A flue defining wall FW extends across the flues just beyond these by-pass flues, but the side and end walls extend beyond the flue wall FW and are built up under a hood portion 162, which is preferably made in the shape of a quarter of a circle and its opposite ends are provided with flanges 163 and 164; the lower one 163 rests on top of and is secured to bolts BS that are laid in the brick walls at the opposite ends of the furnace, and its top flange 164 rests up against the end of the roof castings 165 of the furnace and is removably secured to it by bolts 166.

The front wall FW of the furnace is provided with a door frame 5, that is provided with a coal or other fuel entrance door 5 and with ash pit doors 7, and one of the foundation castings A1 of our Figure 4 retort furnace is illustrated built into the brick work at this point, and the lower retort rests on top of it, and a cast iron plate IP is placed on the wall opposite to the door frame for the lower end of the opposite end of the retort to rest on, and fire clay slabs FC are placed up under the floor 180, see Fig. 22.

The upper ends of the by-pass flues extend into the flue 167 formed between the two retorts and the inside surface of two I-beams and the two opposite outside inclosing walls of the retorts and the heat that enters this middle flue at its opposite ends flows to the center of the length of the furnace and flows out of it into and through two oppositely extending by-pass flues 168 that extend out around and above the upper retort 154 through the opposite brick side walls, into a flue 169 that is formed between brick walls 170 that are built across the roof 184 of the upper retort 154 and this flue 169 extends across the top of the upper retort at the central portion of the length of the furnace. The remainder of the roof portion 184 of this upper retort is covered with asbestos boards 171, or some other material that will prevent the heat from radiating through the roof of the upper retort 154.

The heat from the flue 169 flows into a smoke stack 172 that is provided with a damper 173; the smoke stack rests on I-beams that are placed around the four inside surfaces of the flue 169, the walls 170 of which rest on the roof 184 of the upper retort, and the by-pass flues 168 and the smoke stack are in vertical alignment with the fire box 156 the width of which is defined by the fire or bridge walls 174.

The retorts of this furnace are preferably made of cast iron but the character of the cast iron is not that of the commonly used soft grey cast iron generally used for making castings, but it is for a special grade of hard cast iron that will not be attacked and disintegrated by the chemicals and the acids in the ores and it is about as hard and impervious to heat as white or chilled cast iron.

The retorts are constructed as follows:—A combined opposite side and roof member, wooden pattern is made from which a casting is made, with vertical sides 175 and 176 and a flat horizontal roof member 177, and the lower end portions of the vertical sides are provided with right angled oppositely extending feet members 178 and 179, that extend in opposite directions from their outer and inside surfaces, and these broad foot members rest on top of the fire brick portion of the opposite side walls of the furnace directly above the fire box 156 and the flues 157.

The floor member 180 is made in overlapping end sections for both retorts, and they are made to slide freely in between the vertical opposite sides 175 and 176 of this lower retort from either end of the furnace and they rest on top of the inside foot members 179 of them; and as the floor members slide freely in between the opposite sides of the retorts, they can also be easily drawn or pushed out from between them in case any one or more sections of the floor requires to be removed in case of cracking or bulging and a new section or sections can be pushed in between the sides of the retort to take their place, consequently these floor sections can be taken out of the lower retort without disturbing the side and roof members of the retort and without disturbing the brick work. The roof member 177 extends beyond the vertical sides 175 and 176 in bracket members 181 and the lower ends of the cast iron I-beam members 182 rest on top of them and these I-beams form the opposite enclosing sides of the middle flue 167.

The upper retort 154 is of the same size and of the same shape as the lower retort, as its roof 177 and its sides 175 and 176 are both cast from the same pattern, and its floor members slide in between its side members and rest on their inner feet members 182, consequently the floor members of the upper retort can be withdrawn from between the opposite sides of the upper retort the same as they can from the lower retort.

The I-beams are also cast iron castings and they extend the whole length of the furnace, and the several co-operating parts of the retorts and the I-beams are secured together by bolts 18A and the outside members 178 of the opposite sides of the lower retort are secured to the top of the fire brick walls by vertical bolts 18B, that are built into the brick work as the walls are built. All of the sectional members of the retorts and the I-beams are cast in lengths of five feet and they are all provided with overlapping stepped ends.

The two retorts are provided with compressed air inlet pipes 185 and 186, and they enter the opposite sides of both the upper and lower retorts at the places shown; four being shown in each retort, and the combined air and steam inlet pipes we illustrate in Figure 9 and connected to our Figures 4, 6 and 9A retort furnace, can be connected to these inlets, but any arrangement of air and steam inlet pipes, however, can be used if desired.

In addition to the air and steam inlets into the two retorts, there is also a gas discharging outlet 188, which is placed at about a foot from the discharge end portion of the lower retort, and while we only show one of these gas outlets, we can add one or two or more of them to the retorts if we need them, as we show three gas outlets in each one of our Figures 3 and 6 retorts. This single gas outlet 188 in the retort of this Figure 23 furnace, is for the special purpose of drawing out of the lower retort the heavy gases that collect there, and especially the gases of some ores scrubbing and other treatments to recover their values after the ores are roasted; and in order to accomplish the quick withdrawal of these gases, we connect a pipe 189 to the gas outlet 188 and connect a suction fan 190 to the pipe and from the fan a pipe 191 extends to gas scrubbing apparatus which we do not illustrate.

The floor members of the two retorts are each provided with track members 192, which are preferably cast integrally with them, and on these track members, wheels 193 are mounted and these wheels are mounted on and rotate on round portions 193A formed on square shafts 194, and to these square shafts we secure ore rabbling blades 195, 195A and 195B, and each alternate blade is mounted on a cross shaft 194 and extends down on the floor of the retorts and the intermediate blade 195A is mounted on a cross shaft and projects upward from the shaft, and each three blades of all of those that project upward in the retorts and also all those that project downward are arranged as follows:—Two of each three blades that stand opposite to each other are provided with V-shaped notches 195F that are arranged in sidewise or zigzag out of alignment and they act to stir and mix and rabble the ore as they are moved through the furnace and the third blade in each set of three blades in the length of the conveyor has a straight solid edge that engages the floor all away across its width and pushes the ore ahead of it as it is drawn along the floor of the retorts by the variable speed imparting mechanism, which is the same as the one we illustrate for driving our Figure 4 retort ore rabbling conveyor.

The track members 192 are flat and the wheels 193 also have flat treads on their peripheral surfaces in the furnace shown in Figures 19, 22, 25, 26 and 27; and the links 93 and the link chains are the same as the link chain we use in our retorts, that is, the wheels have hubs and the links are mounted on the hubs in the same manner as the links are mounted on the hubs of the beveled edge wheels in our other retorts.

The rabbling blades 195 are preferably cast iron blades and are provided with short hub members 195C that have a square hole 193C cast in them that fits loosely over the square cross shafts 194, the square holes 193C that are cast in them are made about a quarter of an inch longer than the thickness of the square shaft so they will have a vertical movement on them that will allow their lower edges to aways bear on the floors of the retorts underneath of the wheels on their tracks, and the square shafts in the square holes of the blades keep the blades from turning on these shafts, and while any suitable means can be used for preventing the square shafts and the blades from turning, we preferably show, however, a sliding block 194D which is secured on their opposite ends by split pins 194E; this block has two opposite flat straight ends 194F and 194G and one face bears on the tracks in the upper retort and the other face bears on the tracks in the lower retort and the opposite end edges of these blocks engage the tracks and slide on it when there is enough pressure on the blades to tilt them as the blades are moved through the retorts, but as a rule, the ore pushing blades are heavy enough to hang straight down from their supporting shafts and push the ore ahead of them by their own weight as the ore is dry and hot and is granulated and ground so finely that it will move ahead of the blades when they move against it with a light pressure, and consequently the blocks 194D act more largely as steadiers to prevent any disarranging tilting action of the blades, and they do not bear on the tracks except at their outer end portions when they are tilted by the blades when they are tilted.

The wheels 193 are mounted on sprocket wheels similar in construction to those in the hoods of our other furnace, and the quarter circle end members 162, see Fig. 21, of this retort furnace are the equivalent of the swinging up segments 126 of the hoods of our retort furnace, shown in Figures 1, 4, 6 and 8.

The sprocket wheel 188A at the right hand end of the Figure 19, is mounted on a shaft 95 that is journaled in adjustable boxes and one end of this shaft is provided with a worm gear WG, see Fig. 17, that is connected with the worm pinion 147 of the variable speed imparting tapering cones P1 and P2 and we preferably use this mechanism for rotating the conveyors in all of our retorts.

The opposite sprocket wheel 200 at the left hand of Figures 19 and 23 is also mounted on a shaft 201, the ends of which are mounted in bearing blocks 202, which are slidably mounted in guideways 203 at the upper ends of stands 204 which are supported on the side walls, and inside the hood 162.

Rods 205 are secured at one end to the bearing blocks 202 and extend through the end walls of the guideways 203 and through packing boxes 206 on the front of the hood 162; and the free ends of these rods terminate in heads 207 provided with elongated apertures as shown in Fig. 19. Brackets 208 are bolted to the front of the hood, below and in line with the rods 205, and to these brackets are pivotally secured the apex portions of a pair of bell crank form of levers 209. The upright members of these levers pass through the apertures in the heads 207 and engage the outer ends of the recesses therein. To the outer ends of the horizontal members of these levers are secured depending rods 210 having heads upon their lower ends, and upon the rods are placed weights $b$, in the form of circular flat-faced blocks, each having a radial slot or recess $b1$ extending from its center out through its marginal edge, thus enabling the weight to be placed upon the rods to rest one upon the other, the bottom weights resting upon the heads on the lower ends of the rods. These weights draw upon the bell crank levers, the upright members of which exert a pulling strain on the rods 205 and their bearing blocks 202 which support the shaft 201 having the sprocket wheels 200, whereby the endless chains to which the rabbling blades are secured and maintained under the required tension.

Oil burners 211 can be used for heating the floor of the upper retort as illustrated in the fragmentary view Fig. 21, independent of the fuel burning heat from the fire box, and also oil burners 212 can be used in the fire box as shown for heating the bottom of the lower retort where the use of oil is more economical than coal. When, however, oil burners are to be used, the hood member 162 should be divided at its lower end portion and the two parts hinged together as shown in Fig. 21 by a hinge joint 213, and its upper end should be secured to the end of the roof of the upper retort by a swinging bolt 214, so that the hood can be swung open and access can be had to the oil burners to quickly adjust and clean them when necessary.

The ore is fed into the upper retort at its right hand end through a chute 215 into and through an automatic feed regulating machine 216 from which it drops through a chute 217 onto the floor of the upper retort in front of the ore rabblers of the ore feeding conveyors which stir and rabble it and push it along to the opposite end of the retort where it drops into a chute 218 onto the floor of the lower retort in front of the ore rabblers, and from the end of the floor of the lower retort, the roasted ore drops into a screw conveyor 219, that is set at right angles to the retort furnace and which conveys the roasted ore to further treatment.

We have enclosed the screw conveyor 219 of the furnace in the brick wall at the roasted ore discharging end of the furnace in order to protect it from the heat of the adjacent end of the heat flue below the lower retort, and we build a fire brick wall 220 against its inner side in the flue 157.

The operations of our retort furnaces are as follows:—They are heated up to that degree of heat that has been found by tests is best suited to roast ores in them, then the ore which as before stated must be granulated or pulverized and dried, is fed to and through the ore feeders from a chute 215, and drops into the right hand end of the upper retort and is fed through it by the ore rabblers which move from right to left in the upper retort, and from the end of the upper retort, the ore drops into and through a chute through which it falls onto the floor at the left hand end of the lower retort in front of the ore rabblers as they move through it from left to right, and when the ore has been fed through the lower retort by the rabblers, it drops from it into a conveyor through which it is conveyed to further chemical and mechanical treatments, such as cyanide solution treatments in tanks, and by passing it over amalgamating plates and concentrating tables and by subjecting it to other well known precious metal recovering treatments and their cooperating apparatus.

The amount of the oxygen of the compressed atmospheric air admitted to the retorts while the ore is being roasted as it travels through them depends on the percentage of the sulphur in the ore under treatment, and practical ore roasting experience covering a good many years in roasting ore in muffled retorts to give to them a roast that will chemically change them from hard crystallized sulphides to soft soluble sulphates, points as a general rule to the admittance of about a half ounce of air to each percent of sulphur in the ores. Ores, however, carrying a small percent of sulphur, will not, as a general rule, require that much oxygen, and on the other hand, ores carrying from about and above thirty percent of sulphur may require more than that amount of oxygen in the roasting ore; too little oxygen or too much oxygen will be apt to give a more or less imperfect and unsatisfactory roast and consequently the metallurgical chemist has to determine the amount of and the extent of the admittance of oxygen, the particular ore under treatment requires, to give to it a perfect roast by making frequent tests of the ore as it is traveling through roasting treatment.

Having described our invention what we claim as new and desire to secure by Letters Patent, is:—

1. In a muffled retort furnace for roasting refractory ores and oil shales, the combination of an ore roasting furnace having outside walls, muffled retorts within said walls placed one above the other and separated from one another by a flue space, said retorts being made of a different material from said outside walls, a flue underneath the lower retort, a fire box in the center of the length of said flue, a smoke stack connected to said flue space and positioned above said fire box in the center of the length of the flue, and means in said fire box and said flues for heating said retorts, with means for heating each retort independently of the other, and in conjunction of the means in the fire box and lower flue, for heating both retorts, said retorts being provided with floor members divided into sections, and outwardly movable means for normally supporting the opposite side edges of the ends of the individual floor sections, whereby said sections may be removed without removing the outside walls of said furnace.

2. In an ore roasting muffled retort furnace, the combination of outside muffled retort supporting walls, heat muffled retorts within said walls and supported thereby, flues within said walls arranged around said retorts, and fuel burners within said flues arranged to heat said retorts, said retorts being provided with ore roasting floor members, with means including an endless travelling mechanism for moving and rabbling ore through said retorts, comprising means including roller members provided with solid peripheral portions having gaps formed therein, said solid peripheral portion of each roller being arranged to enter the ore on the floors of said retorts, and raise it up on its inner peripheral surface and cause it to flow back on to the floors of the retorts, as the solid peripheral portions of the rollers move rotatively up through it, thus turning the ore over and over upon itself, as they move the ore forward through the retorts and means for operating said rabbling mechanism.

3. A retort furnace for roasting refractory ores and oil shales, provided with outside walls, muffled retorts within said walls placed one above the other and separated from one another far enough to form a flue space between, a flue underneath the lower retort, a fire box in the center of the length of said flue, a chimney above said fire box in the center of the length of said flue, and a flue connected to said chimney from said fire box flues, and means in said fire box and flues for heating said retorts, said retorts being provided with sectionally made floors, blocks slidably mounted in the outside walls for supporting the ends of the floor sections, means to withdraw said blocks, thereby to permit the removal of the floor sections without disturbing the outside walls, and means for continuously rabbling the ore and moving it through said retorts to an outlet.

4. In a retort furnace the combination with a muffled retort of ore moving and rabbling mechanism comprising rolling members provided with hollow hubs having perforations, hollow perforated peripheral blade members mounted on said hubs and stationary means to rotate said blades comprising perforated pipes arranged to admit fluid under pressure to said hubs.

5. In a retort furnace the combination with a muffled retort of ore moving mechanism comprising hubs carrying blades, said hubs being hollow and provided with perforations and said blades being channeled, said perforations in said hubs communicating with said channels in said blades and stationary means to rotate said blades comprising perforated pipes, whereby fluid under pressure may be admitted to the perforated hubs and thence through the channels to said blades.

6. A retort furnace for roasting refractory ores and oil shales, muffled retorts placed one above the other and separated from one another far enough to form a flue space between them, said retorts being provided with ore movers and rabblers comprising roller members having solid peripheral portions and gaps between them in the circumference of each roller, said solid peripheral portions being arranged to move down into the ore against the floors and to raise up a portion of it on their inner peripheral portions, said solid peripheral members being arranged and adapted to form solid peripheral or rotating shoveling members, said roller members having hubs with spokes extending from them to their peripheral ore shoveling portions, and forming a part thereof, said hubs and spokes and peripheral ore shoveling members being provided with air passageway apertures through them from their hubs to the outside surface of said peripheral ore shoveling members, means including tubes for leading air into the hub members of said rollers, said tube members being adapted to also turn said rollers when engaged by them.

7. In a retort furnace for roasting refractory ores and oil shales, the combination with a muffled retort, of a travelling conveyor having wheel supporting cross rods, chain links mounted on and connecting said wheels and cross rods together into an endless link conveyor, and a plurality of ore rabbling rollers, each consisting of a hub member and spoke members and short peripheral surface members integral with said spoke members and separated from one another by a gap that extends between them and the spoke to the outside surface of the hub member, said peripheral members having their opposite edges arranged to form ore shoveling blades in either direction the roller may be turned, said hub and spokes and shoveling members being provided with air passageways through them, the said hubs of each of said roller being rotatively mounted on said cross rods and having a bore enough larger than the size of said cross rods to have a vertical movement on them and arranged on said rods to engage and move along the floor of said retorts a short distance intermittently as the conveyor moves through said retorts, and means including fixed members extending across said retorts in the path of said rollers and arranged to be engaged by the spokes of each of said rollers and to cause each roller to turn intermittently a part of a revolution around the cross rod upon which it is mounted as the conveyor moves the rollers through the retorts and variable speed power means for moving the conveyor to move the rollers to shovel up and rabble the ore and move it at different predetermined speeds through said retorts.

8. A retort furnace for roasting refractory ores and oil shales, provided with outside walls composed of separate members, muffled retorts within said walls placed one above the other and separated from one another far enough to form a flue space between and around them within said walls, said retorts being made of a different material from said outside walls, a flue underneath the lower retort, a fire box in the center of the length of said flue, a chimney above said fire box in the center of the length of said flue, and a flue connected to said chimney from said fire box flues, means in said fire box and flues for heating said retorts, said separately built outside walls being provided with slideways extending transversely to the length of the furnace, blocks slidably mounted in said slideways, with retorts independent of but supported between said walls, said retorts having individual floor members, said sliding blocks being arranged to releasably support the opposite side edges of said floor members and means including a threaded shaft and nuts for releasably securing said retorts to the inside surface of said walls and also at the same time for securing said sliding blocks to the outside surface of said outside walls, and with heating apparatus within said outside walls underneath said sliding blocks.

9. A retort furnace for roasting refractory ores and oil shales, provided with outside walls, muffled retorts within said walls placed one above the other and separated from one another far enough to form a flue space between them, a flue underneath the lower retort, a fire box in the center of the length of said flue, a chimney, a flue connected to said chimney from said fire box flues, means in said fire box and flues for heating said retorts, bypass flues at the opposite ends of said fire box flue extending from the lower flue to the flue between the retorts, the floor members of the retort being removably secured to the outside wall members, an ore rabbling endless conveyor provided with rolling members to engage the floor portion of said retorts and move the ore through said retorts, hood portions enclosing the opposite ends of said retorts and provided with shafts and sprocket wheels on said shafts upon which said endless ore rabbling conveyor is mounted, means including a variable speed power transmitting mechanism connected to the shaft of one of said sprocket wheels to rotate the same, and an adjustable bearing for the shaft of the other sprocket wheel.

10. A retort furnace for roasting refractory ores and oil shales, provided with outside walls, muffled retorts within said walls placed one above the other and separated from one another far enough to form a flue space between and a flue underneath the lower retort, a fire box in the center of the length of said flue, a chimney, a flue connecting said chimney and the flue beneath the lower retort, means in said fire box and flues for heating said retorts, by-pass pipes connecting the lower and upper flues, an endless conveyor in said retorts, valve controlled air and steam inlet pipes in the opposite side wall of said retorts, a gas outlet pipe adjacent the end of the lower retort, an exhaust fan connected thereto and a pipe leading away from said exhaust fan and adapted to be connected to gas scrubbing machinery.

11. In an ore roasting muffled retort furnace, the combination with muffled retorts, flues arranged to heat said retorts, and fuel burners in said flues for heating said retorts; of means for moving and rabbling ore through said retorts, including an endless traveling mechanism, comprising rolling members having solid annular perimeters which are gapped to form rabbling members which enter the ore on the floors of the retorts, and turn it over and over upon itself as they rotate and at the same time moving it forward through the furnace, and means for operating said rabbling mechanism.

12. In a retort furnace of the character described the combination with side walls, of muffled retorts supported thereby and separated by a flue space, a flue space being formed below the lower retort, said retorts being formed of floor and roof sections; ledges on said walls for supporting the ends of the said roof sections, means for supporting the ends of the floor sections comprising blocks slidably mounted in the walls, and having right angled portions which bear against the outside faces of the walls; and bolts in said right angled portions which are adapted to be screwed against the walls thereby to withdraw said blocks and permit a floor section to drop for removal and replacement by a new section; means for heating said retorts, and means for continuously moving material through said retorts to a discharge.

13. In a retort furnace of the character described the combination with a muffled retort; of mechanism for rabbling and moving material through said retort, comprising a pair of endless chains, rods connecting said chains, rolling members comprising a pair of spaced hubs on each rod, each hub having radial arms, the arms of one hub being connected to the arms of the other rabbling blades, and stationary means projected in the paths of said arms whereby said rolling members are rotated as they are moved through the retort by said chains.

14. The structure as set forth in claim 13, wherein the inner faces of the rabbling blades are formed with longitudinal corrugations.

15. A retort furnace for roasting refractory ores and oil shales, comprising outside walls, muffled retorts comprising floor and roof sections, a flue space being formed between said retorts, and beneath the lower retort, stationary means on said walls for supporting the ends of said roof sections, means slidably secured in said walls for normally supporting the ends of the floor sections, means in said flues for heating each retort independently of the other, means for admitting air and steam to said retorts, and means for continuously moving material through said retorts to a discharge.

16. In a retort furnace of the character described retorts arranged one above the other and separated by a flue space, hoods at the ends of said retorts, shafts in said hoods, one of which has slidable bearings, rods connected to said bearings and extending out through the adjacent hood, bell cranks mounted on said hood, an arm of each of which is connected to one of said rods, and weights on their other ends, sprocket wheels on said shafts and an endless rabbling device carried by said sprocket wheels.

17. The combination with a horizontal retort, of an endless rabbler therein, comprising endless driven chains, rods connecting said chains and rolling members on said rods each of which comprises a hollow shaft through which one of said rods passes, hubs on the ends of said hollow shaft having radial arms, rabbling blades which connect the arms of one of said hubs with those of the other hub, stationary elements in said retort which engage the hub arms as the chains move, and cause said rolling members to rotate, rollers on the ends of said rods and tracks on the sides of said retort on which said rollers ride.

In testimony whereof, we affix our signatures.

HOWARD S. BAILEY.
RAY A. BENNETT.